(12) United States Patent
Zhang et al.

(10) Patent No.: US 8,817,039 B2
(45) Date of Patent: Aug. 26, 2014

(54) IMAGE PROCESSING DEVICE AND IMAGE PROCESSING METHOD

(75) Inventors: Xiaomang Zhang, Osaka (JP); Akiko Yoshida, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 684 days.

(21) Appl. No.: 12/998,895

(22) PCT Filed: Feb. 8, 2010

(86) PCT No.: PCT/JP2010/051791
§ 371 (c)(1),
(2), (4) Date: Jun. 14, 2011

(87) PCT Pub. No.: WO2010/131500
PCT Pub. Date: Nov. 18, 2010

(65) Prior Publication Data
US 2011/0249016 A1    Oct. 13, 2011

(30) Foreign Application Priority Data
May 15, 2009    (JP) .................. 2009-118334

(51) Int. Cl.
| | |
|---|---|
| *G09G 5/00* | (2006.01) |
| *G09G 5/02* | (2006.01) |
| *G06F 15/16* | (2006.01) |
| *H04N 5/202* | (2006.01) |
| *H04N 11/06* | (2006.01) |
| *H04N 9/73* | (2006.01) |
| *H04N 9/67* | (2006.01) |
| *H04N 9/64* | (2006.01) |
| *H04N 1/46* | (2006.01) |
| *G03F 3/08* | (2006.01) |
| *G06K 9/00* | (2006.01) |
| *G06K 9/40* | (2006.01) |
| *G06T 11/00* | (2006.01) |
| *G06K 9/36* | (2006.01) |
| *G06K 9/32* | (2006.01) |
| *H04N 1/60* | (2006.01) |

(52) U.S. Cl.
CPC ................ *G09G 5/02* (2013.01); *G06T 11/001* (2013.01); *H04N 1/6058* (2013.01)
USPC ........... 345/600; 345/591; 345/606; 345/643; 345/502; 345/590; 348/254; 348/708; 348/488; 348/655; 348/661; 358/516; 358/519; 358/523; 358/525; 358/448; 382/167; 382/274; 382/276; 382/300

(58) Field of Classification Search
USPC ......... 345/643, 606, 502, 443, 581, 589–590, 345/600–601, 616–618, 626, 441, 501, 506, 345/549, 660, 690; 348/254, 441, 655, 661, 348/708, 256, 469, 488, 496, 517, 557, 560, 348/571, 580, 599, 630; 358/516, 519, 523, 358/525, 448; 382/167, 274, 276, 162, 382/298–300, 303, 305
See application file for complete search history.

(56) References Cited

U.S. PATENT DOCUMENTS

| | | |
|---|---|---|
| 5,258,829 A | 11/1993 | Matsunaga et al. |
| 5,596,425 A * | 1/1997 | Usui et al. .................... 358/500 |
| 5,933,252 A | 8/1999 | Emori et al. |
| 6,072,588 A * | 6/2000 | Dohnomae .................... 358/1.9 |
| 2003/0053085 A1* | 3/2003 | Takemoto .................... 358/1.9 |
| 2004/0252303 A1* | 12/2004 | Giorgianni et al. ........... 356/402 |
| 2006/0013478 A1 | 1/2006 | Ito et al. |
| 2009/0278982 A1 | 11/2009 | Imai et al. |

FOREIGN PATENT DOCUMENTS

| | | |
|---|---|---|
| JP | 4-291591 A | 10/1992 |
| JP | 6-225130 A | 8/1994 |
| JP | 4040625 B | 11/2007 |
| JP | 4045929 B | 11/2007 |
| JP | 200878737 A | 4/2008 |
| JP | 200886029 A | 4/2008 |
| JP | 4241902 B | 1/2009 |

\* cited by examiner

*Primary Examiner* — Wesner Sajous

(74) *Attorney, Agent, or Firm* — Harness, Dickey & Pierce, P.L.C.

(57) ABSTRACT

Provided is an image processing device which enables image display that takes full advantage of a color reproduction performance of a panel without providing a viewer with a feeling of strangeness. An image processing device includes: a color gamut conversion processor configured to convert inputted data into RGB data according to a liquid crystal panel; a weighting factor calculator configured to calculate a weighting factor; a first post-color-gamut-conversion data weighting processor configured to perform weighting processing to the RGB data; an inputted data weighting processor configured to perform weighting processing to the inputted data; and an output adder configured to add data after the weighting processing to generate RGB data to be supplied to the liquid crystal panel. The weighting factor calculator obtains the weighting factor based on a positional relation among a chromaticity coordinate on an xy chromaticity diagram, a color reproduction range for the inputted data, and a boundary line defined so as to include memory colors.

33 Claims, 18 Drawing Sheets

Fig.13

| i | $K_1[i]$ |
|---|---|
| 1 | 0 |
| 2 | 0.221199 |
| 3 | 0.393469 |
| ⋮ | ⋮ |
| 29 | 0.999447 |
| 30 | 0.999569 |
| 31 | 0.999665 |

|  |  | R (RED) | G (GREEN) | B (BLUE) | W (WHITE) |
|---|---|---|---|---|---|
| HDTV STANDARD (ITU-R BT.709 STANDARD) | x | 0.6400 | 0.3000 | 0.1500 | 0.3127 |
|  | y | 0.3300 | 0.6000 | 0.0600 | 0.3290 |
| LIQUID CRYSTAL PANEL (AN EXAMPLE) | x | 0.6496 | 0.2840 | 0.1499 | 0.2744 |
|  | y | 0.3288 | 0.6324 | 0.0540 | 0.2765 |

{ 91 (HDTV rows), 92 (Liquid crystal panel rows) }

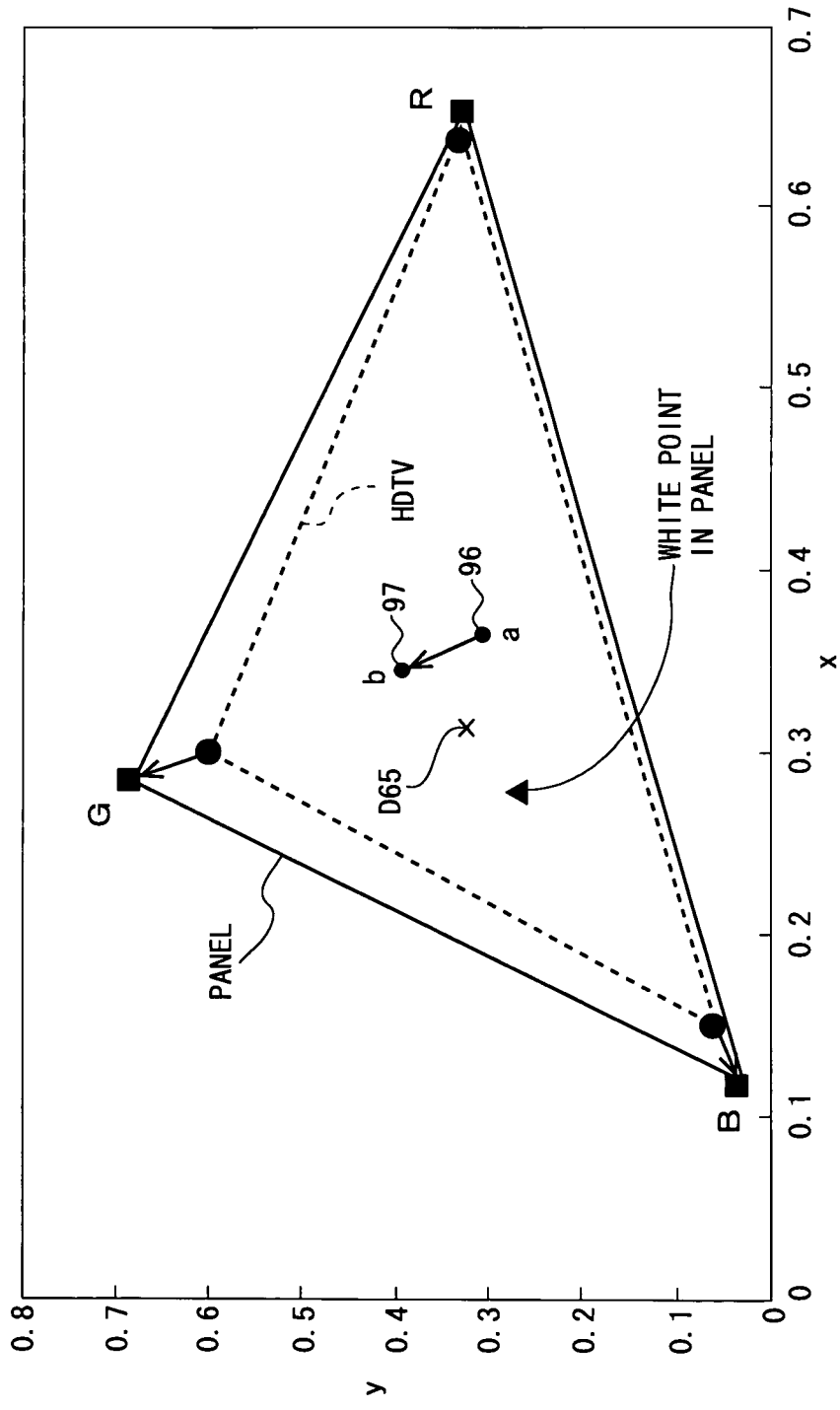

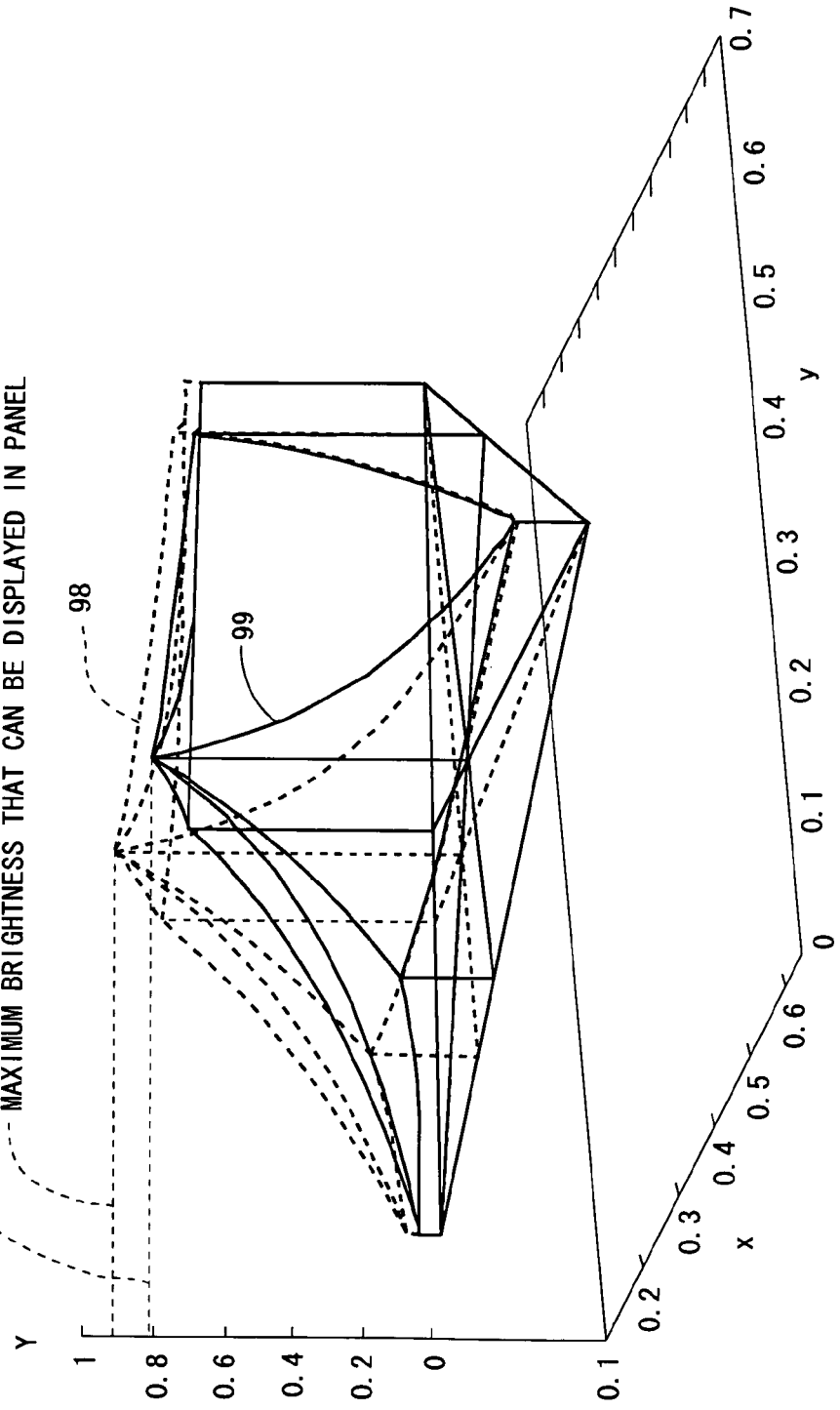

IMAGE PROCESSING DEVICE AND IMAGE PROCESSING METHOD

TECHNICAL FIELD

The present invention relates to an image processing device and an image processing method, and in particular, to a technique of displaying in a way taking full advantage of a color reproduction range of the device.

BACKGROUND ART

In general, a color reproduction range (also referred to as a "color space", a "color gamut", or a "color purity") of display apparatuses, printing apparatuses, image pickup apparatuses, and the like is different by the model. In addition, for color television apparatuses, a color reproduction range of inputted video signals is different by the employed television system. For this reason, conventionally, color conversion processing of a variety of types is performed when generating output data based on inputted data, in order to output colors as accurately as possible to the inputted data regardless of the color reproduction range. For example, when performing HDTV (High Definition Television) broadcasting using a color television apparatus that employs a liquid crystal panel, signals in a standard specified by ITU-R (International Telecommunication Union Radiocommunications Sector) BT.709 (hereinafter referred to as the "HDTV standard") are supplied to the color television apparatus from an external signal source. In this case, the signals supplied to the color television apparatus from the external signal source are RGB signals. In the color television apparatus, mapping (matching) processing of a color gamut of an RGB signal supplied from the signal source to a color gamut in the liquid crystal panel that constitutes the color television apparatus (hereinafter referred to as the "color gamut conversion processing") is performed. Then, by applying a voltage corresponding to a value of each color included in the RGB signal obtained through the color gamut conversion processing to the liquid crystal layer, color is displayed in a display portion of the liquid crystal panel as accurately as possible to color represented by the RGB signal supplied from the signal source. The following describes the color gamut conversion processing performed in the color television apparatus in detail.

FIG. 15 is a table showing chromaticity coordinate values (coordinate values on an xy chromaticity diagram) of primary colors in the HDTV standard and chromaticity coordinate values of primary colors in a liquid crystal panel that constitutes a display apparatus (color television apparatus). Referring to FIG. 15, for example, it can be seen that "the chromaticity coordinate (x, y) for R (red) is (0.6400, 0.3300) in the HDTV standard". In this case, by performing normalization based on information related to the HDTV standard represented by a reference numeral 91 in FIG. 15 such that brightness Y of W (white) in the XYZ color space is 1, a following equation (1) expressing a relation between an RGB value and an XYZ value can be obtained. It should be noted that X, Y, and Z are tristimulus values in an XYZ colorimetric system.

[Equation 1]

$$\begin{pmatrix} X \\ Y \\ Z \end{pmatrix} = \begin{pmatrix} 0.4124, & 0.3576, & 0.1805 \\ 0.2126, & 0.7152, & 0.0722 \\ 0.0193, & 0.1192, & 0.9505 \end{pmatrix} \begin{pmatrix} R \\ G \\ B \end{pmatrix}_{HDTV} \quad (1)$$

Similarly, a following equation (2) expressing a relation between the RGB value and the XYZ value based on information related to the liquid crystal panel represented by a reference numeral 92 in FIG. 15 can be obtained as listed below.

[Equation 2]

$$\begin{pmatrix} X \\ Y \\ Z \end{pmatrix} = \begin{pmatrix} 0.4091, & 0.3101, & 0.2840 \\ 0.2071, & 0.6906, & 0.1023 \\ 0.0136, & 0.0913, & 1.5085 \end{pmatrix} \begin{pmatrix} R \\ G \\ B \end{pmatrix}_{panel} \quad (2)$$

Furthermore, where "right side in the equation (1)=right side in the equation (2)", a following equation (3) can be obtained as listed below.

[Equation 3]

$$\begin{pmatrix} R \\ G \\ B \end{pmatrix}_{panel} = \begin{pmatrix} 1.0002, & 0.1021, & -0.0056 \\ 0.0075, & 1.0024, & 0.0130 \\ 0.0033, & 0.0174, & 0.6294 \end{pmatrix} \begin{pmatrix} R \\ G \\ B \end{pmatrix}_{HDTV} \quad (3)$$

In this case, the equation (3) is to obtain values of the respective RGB colors corresponding to voltage values to be applied to a liquid crystal layer in the liquid crystal panel from the RGB signals in the HDTV standard supplied from the signal source. Specifically, as shown in FIG. 16, an RGB signal $RGB_{in}$ in the HDTV standard is inputted into a display apparatus (color television apparatus) 9 from a signal source 93, and the RGB signal $RGB_{in}$ is converted based on the equation (3) by a color gamut conversion processor 94. Then, an RGB signal $RGB_{out}$ obtained through the conversion processing by the color gamut conversion processor 94 is supplied to a liquid crystal panel 95. In this manner, color accurate to the color represented by the RGB signal $RGB_{in}$ supplied from the signal source 93 is displayed in a display portion of the liquid crystal panel 95.

Further, conventionally, there is known white balance processing for correcting colors such that white color is displayed correctly regardless of a color temperature of a light source. In white balance processing, a value of each color of RGB is multiplied by a predetermined gain so as to suppress a disturbance in the balance among the RGB colors due to a difference between light sources.

It should be noted that, in relation to the present invention, the following prior art references are known. Japanese Unexamined Patent Application Publication No. H04-291591 discloses an invention relating to a color display apparatus capable of reproducing colors of any of inputted video signals having a plurality of different color reproduction ranges from each other without a color reproduction error. Japanese Unexamined Patent Application Publication No. 2008-78737 discloses a technique of preventing a color gamut of an image output device from being unnecessarily wide by correcting brightness or luminance. Japanese Unexamined Patent Application Publication No. 2008-86029 discloses a method of acquiring desired color reproduction by utilizing a standard color space with an extended color gamut.

PRIOR ART DOCUMENTS

Patent Documents

Patent Document 1: Japanese Unexamined Patent Application Publication No. H04-291591

Patent Document 2: Japanese Unexamined Patent Application Publication No. 2008-78737

Patent Document 3: Japanese Unexamined Patent Application Publication No. 2008-86029

SUMMARY OF THE INVENTION

Problems to be Solved by the Invention

In the meantime, the color reproducibility of liquid crystal panels has been remarkably improved in recent years, and liquid crystal panels whose NTSC ratio is about 150% have become realized. A color reproduction range of such a liquid crystal panel is wider than a color reproduction range based on the HDTV standard. For this treason, there is a growing demand for display of an image taking full advantage of a color reproduction performance of such a liquid crystal panel (display of an image utilizing a wider range of colors). However, according to the color gamut conversion processing described above, although it is possible to display colors accurate to colors represented by the inputted video signals, image display using an area that is within the color reproduction range of the panel but out of the color reproduction range of the inputted video signals is not performed. Specifically, image display taking advantage of a color reproduction performance of the panel is not performed. For example, conversion from an RGB signal in the HDTV standard to an RGB signal for the panel is performed based on the equation (3). According to the equation (3), when a value of the RGB signal in the HDTV standard is pure blue (0.0, 0.0, 1.0), a value of the RGB signal for the panel is (0.0, 0.0, 0.6294). Specifically, this means only about 63% of a maximum color reproduction range is used for B (blue). Further, also in the color display apparatus disclosed in Japanese Unexamined Patent Application Publication No. H04-291591 listed above, as can be seen from FIG. 17, image display using a range beyond the color reproduction range based on the HDTV standard is not performed.

Moreover, according to the white balance processing, although white color is accurately displayed, colors other than white are displayed according to properties of the panel, resulting in that color deviation in memory colors such as in specific flesh color provides a viewer with a feeling of strangeness. This issue will be described with reference to FIG. 18. In the white balance processing, by multiplying each color value of an RGB signal based on the HDTV standard by a predetermined gain, D65 (reference white color) is correctly displayed in the panel regardless of the difference between a chromaticity coordinate of a white point in the panel and a chromaticity coordinate of D65. However, in an example shown in FIG. 18, along with changes in chromaticity coordinates of G (green) and B (blue), for example, color having a chromaticity coordinate at an a-point represented by a reference numeral 96 based on the HDTV standard is displayed as color having a chromaticity coordinate at a b-point represented by a reference numeral 97 in the panel. Thus, color other than white color is not displayed accurately to color represented by the inputted video signal. Further, FIG. 19 schematically shows an xyY color space (reference numeral 98) of the panel and an xyY color space (reference numeral 99) obtained by the white balance processing. Referring to FIG. 19, focusing on brightness Y, it can be seen that maximum brightness that can be displayed in the panel is higher than maximum brightness obtained by the white balance processing. Specifically, display of the brightness in a way taking full advantage of the panel is not performed by the white balance processing.

Furthermore, while it is possible to take advantage of a color reproduction performance of the panel when color values of the respective RGB signals based on the HDTV standard are supplied to the panel as they are, color different from color represented by the inputted video signal is displayed, resulting in that color deviation in memory colors such as in specific flesh color provides the viewer with a feeling of strangeness.

Therefore, an object of the present invention is to provide an image processing device which enables image display that takes full advantage of a color reproduction performance of a panel without providing a viewer with a feeling of strangeness.

Means for Solving the Problems

A first aspect of the present invention is directed to an image processing device, comprising:

an RGB data converter configured to perform predetermined conversion processing to first RGB data to generate second RGB data, the first RGB data being externally supplied image data in an RGB colorimetric system;

a weighting factor calculator configured to convert the first RGB data into XYZ data and to calculate a weighting factor based on the XYZ data, the XYZ data being data in an XYZ colorimetric system, the weighting factor being used for performing weighting processing to the first RGB data and the second RGB data;

a first weighting processor configured to perform weighting processing to the first RGB data by multiplying the first RGB data by a first factor obtained based on the weighting factor;

a second weighting processor configured to perform weighting processing to the second RGB data by multiplying the second RGB data by a second factor obtained based on the weighting factor, the second factor increasing and decreasing in an manner opposite to the first factor; and an output adder configured to generate RGB data for output to be supplied to an external output device by adding data obtained through the weighting processing by first weighting processor and data obtained through the weighting processing by the second weighting processor, wherein the weighting factor calculator:
 obtains a first coordinate, a second coordinate, and a third coordinate for data of each pixel included in the XYZ data, on one of an xy chromaticity diagram and a uv chromaticity diagram, and calculates the weighting factor based on a positional relation among the first coordinate, the second coordinate, and the third coordinate, the first coordinate being a chromaticity coordinate of the corresponding pixel data, the second coordinate being a chromaticity coordinate of an intersection point between a weighting factor calculation line, that is a straight line passing a predetermined reference coordinate and the first coordinate, and a line indicating a color reproduction range obtained by the XYZ data, the third coordinate being a chromaticity coordinate of an intersection point between a boundary line that includes at least three points and defines a closed region and the weighting factor calculation line, and
 determines a value of the weighting factor such that a value of the first factor is 0, when the first coordinate is within the boundary line.

According to a second aspect of the present invention, in the first aspect of the present invention, when the first coordinate is outside the boundary line, the weighting factor calculator takes a value obtained by dividing a distance between the third coordinate and the first coordinate by a distance between the third coordinate and the second coordinate as the value of the weighting factor.

According to a third aspect of the present invention, in the first aspect of the present invention, the value of the first factor is equal to the value of the weighting factor.

According to a fourth aspect of the present invention, in the first aspect of the present invention, the value of the first factor is obtained by an equation, $$k_1 = 1 - e^{-k\lambda},$$

wherein, $k_1$ is the first factor, k is the weighting factor, e is a base of natural logarithm, and $\lambda$ is a positive factor that is determinable to be any value.

According to a fifth aspect of the present invention, in the fourth aspect of the present invention, the image processing device further comprises a look-up table that previously stores a plurality of values of the first factor each in association with a predetermined index, wherein the weighting factor calculator acquires a value of the first factor from the look-up table by using an index obtained based on the weighting factor.

According to a sixth aspect of the present invention, in the first aspect of the present invention, the RGB data converter includes a color gamut conversion processor configured to generate the second RGB data such that a color reproduction range to be a reference when the first RGB data is generated is equal to a color reproduction range obtained by supplying the second RGB data to the output device.

According to a seventh aspect of the present invention, in the first aspect of the present invention, the RGB data converter includes a white balance processor configured to generate the second RGB data by multiplying a value of each color of the first RGB data by a gain that is previously determined for the corresponding color.

According to an eighth aspect of the present invention, in the first aspect of the present invention, the RGB data converter includes:
 a color gamut conversion processor configured to perform conversion processing to the first RGB data to generate the third RGB data such that a color reproduction range obtained by supplying the third RGB data to the output device is equal to a color reproduction range to be a reference when the first RGB data is generated, the third RGB data being data obtained after the conversion of the first RGB data;
 a third weighting processor configured to perform weighting processing to the third RGB data by multiplying the third RGB data by a previously determined third factor;
 a white balance processor configured to generate fourth RGB data by multiplying a value of each color of the first RGB data by a gain that is previously determined for the corresponding color;
 a fourth weighting processor configured to perform weighting processing to the fourth RGB data by multiplying the fourth RGB data by a fourth factor increasing and decreasing in an manner opposite to the third factor; and
 a data adder configured to generate the second RGB data by adding data obtained through the weighting processing by the third weighting processor and data obtained through the weighting processing by the fourth weighting processor.

According to a ninth aspect of the present invention, in the eighth aspect of the present invention, the image processing device further comprises a scaling processor and a fifth weighting processor, in place of the first weighting processor, the scaling processor generating fifth RGB data by multiplying the value of each color of the first RGB data by a scaling factor that is previously determined for the corresponding color, the fifth weighting processor performing weighting processing to the fifth RGB data by multiplying the fifth RGB data by the first factor, wherein the output adder adds data obtained through the weighting processing by the fifth weighting processor in place of the first weighting processor and data obtained through the weighting processing by the second weighting processor.

According to a tenth aspect of the present invention, in the first aspect of the present invention, the boundary line is defined so as to include therein a chromaticity coordinate for D65 which is a standard light source.

According to an eleventh aspect of the present invention, in the first aspect of the present invention, the boundary line is defined so as to include therein chromaticity coordinates of memory color including at least white color and flesh color.

A twelfth aspect of the present invention is directed to a display apparatus having a display panel, as the output device, configured to display an image, the display apparatus comprises the image processing device according to any one of the first through the eleventh aspects of the present invention.

A thirteenth aspect of the present invention is directed to an image processing method, comprising:

an RGB data converting step of performing predetermined conversion processing to first RGB data to generate second RGB data, the first RGB data being externally supplied image data in an RGB colorimetric system;

a weighting factor calculating step of converting the first RGB data into XYZ data and calculating a weighting factor based on the XYZ data, the XYZ data being data in an XYZ colorimetric system, the weighting factor being used for performing weighting processing to the first RGB data and the second RGB data;

a first weighting processing step of performing weighting processing to the first RGB data by multiplying the first RGB data by a first factor obtained based on the weighting factor;

a second weighting processing step of performing weighting processing to the second RGB data by multiplying the second RGB data by a second factor obtained based on the weighting factor, the second factor increasing and decreasing in an manner opposite to the first factor; and an output adding step of generating RGB data for output to be supplied to an output device by adding data obtained through the weighting processing in the first weighting processing step and data obtained through the weighting processing in the second weighting processing step, wherein in the weighting factor calculating step,
 a first coordinate, a second coordinate, and a third coordinate are obtained for data of each pixel included in the XYZ data, on one of an xy chromaticity diagram and a uv chromaticity diagram, and the weighting factor is calculated based on a positional relation among the first coordinate, the second coordinate, and the third coordinate, the first coordinate being a chromaticity coordinate of the corresponding pixel data, the second coordinate being a chromaticity coordinate of an intersection point between a weighting factor calculation line, that is a straight line passing a predetermined reference coordinate and the first coordinate, and a line indicating a color reproduction range obtained by the XYZ data, the third coordinate being a chromaticity coordinate of an intersection point between a boundary line that includes at least three points and defines a closed region and the weighting factor calculation line, and a value of the weighting factor is determined such that a value of the first factor is 0, when the first coordinate is within the boundary line.

In addition, variants that are grasped by referring to the embodiment and the drawings in the thirteenth aspect of the present invention are considered to be means for solving the problems.

Effects of the Invention

According to the first aspect of the present invention, weighting processing is performed to the second RGB data that is data after performing predetermined conversion processing to the inputted data and to the first RGB data that is the inputted data, and combined data of the data after performing the weighting processing is supplied to the output device. The weighting factor for weighting processing is determined based on the positional relation, on the xy chromaticity diagram, among "the chromaticity coordinate of the color represented by the inputted data", "the color reproduction range as a reference of the inputted data", and "the predetermined boundary line". Then, the first factor determined based on the weighting factor is used in the weighting processing to the first RGB data, and the second factor that increases and decreases in an manner opposite to the first factor is used in the weighting processing to the second RGB data. In addition, the weighting factor is determined such that the first factor is 0 for colors whose chromaticity coordinate is within the boundary line on the xy chromaticity diagram. Therefore, the colors whose chromaticity coordinate is within the boundary line on the xy chromaticity diagram are displayed based only on the second RGB data, that is, displayed based only on the data after the predetermined conversion processing is performed to the inputted data. In this case, by employing an configuration in which a processing for displaying colors accurate to the colors represented by the inputted data, as the predetermined conversion processing, is performed and in which the boundary line is defined considering human visual features, it is possible to display colors accurate to the colors represented by the inputted data for memory colors, for example. By contrast, colors whose chromaticity coordinate is outside the boundary line on the xy chromaticity diagram are displayed based on the data subjected to the weighting processing to the first RGB data and the second RGB data. Therefore, for the colors whose chromaticity coordinate is outside the boundary line on the xy chromaticity diagram, it is possible to display, on the xy chromaticity diagram, colors of a further outward side. As described above, it is possible to perform image display taking full advantage of a color reproduction performance of the output device without providing a viewer with a feeling of strangeness.

According to the second aspect of the present invention, the value of the weighting factor increases as the chromaticity coordinate of the color represented by the inputted data becomes closer to the outline of the color reproduction range as a reference of the inputted data. Therefore, a heavier weight is given to the inputted data for color whose chromaticity coordinate on the xy chromaticity diagram is relatively outward. With this, an entire color reproduction range of the output device is more effectively used when displaying an image.

According to the third aspect of the present invention, the arithmetic processing for obtaining the first factor is not necessary, and thus the implementation is facilitated.

According to the fourth aspect of the present invention, by setting $\lambda$ to be an appropriate value, it is possible to perform image display using colors of a range wider than the color reproduction range obtained by the inputted data without providing a viewer of an image with a feeling of strangeness.

According to the fifth aspect of the present invention, as the first factor used for weighting processing is acquired from the look-up table, the arithmetic processing for obtaining the first factor is not necessary, and thus the implementation is facilitated.

According to the sixth aspect of the present invention, color gamut conversion processing is performed as the predetermined conversion processing for generating the second RGB data from the first RGB data. Therefore, colors whose chromaticity coordinate is within the boundary line on the xy chromaticity diagram are displayed accurately to colors represented by the inputted data. With this, it is possible to perform image display taking full advantage of the color reproduction performance of the output device while effectively suppressing a feeling of strangeness provided for a viewer.

According to the seventh aspect of the present invention, white balance processing is performed as the predetermined conversion processing for generating the second RGB data from the first RGB data. Therefore, colors whose chromaticity coordinate is within the boundary line on the xy chromaticity diagram are displayed in colors to which the white balance processing has been performed. With this, in an output device capable of performing favorable display only with white balance adjustment without requiring such as color gamut conversion processing, it is possible to perform image display taking full advantage of the color reproduction performance of the output device without providing a viewer with a feeling of strangeness.

According to the eighth aspect of the present invention, color gamut conversion processing and white balance processing are performed as the predetermined conversion processing for generating the second RGB data from the first RGB data. Here, as for colors whose chromaticity coordinate is within the boundary line on the xy chromaticity diagram, combined data of the data after the color gamut conversion processing and the data after the white balance processing is supplied to the output device. With this, while performing favorable display of colors whose chromaticity coordinate is within the boundary line on the xy chromaticity diagram by the color gamut conversion processing and the white balance processing, it is possible to perform image display taking full advantage of the color reproduction performance of the output device for colors whose chromaticity coordinate is outside the boundary line on the xy chromaticity diagram.

According to the ninth aspect of the present invention, there is provided the scaling processor configured to multiply the value of each color of the first RGB data by a factor previously determined for the corresponding color. Here, combined data of the data after the scaling processing and the data after the predetermined conversion processing is supplied to the output device. Therefore, when performing image display using, on the xy chromaticity diagram, colors of the further outward side, it is possible to adjust saturation of the colors to be displayed in the output device.

According to the tenth aspect of the present invention, as for data of D65 which is the standard light source, display is performed based on the data after the predetermined conversion processing is performed to the inputted data. Therefore, by taking a configuration in which processing for displaying colors accurate to colors represented by the inputted data is performed as the predetermined conversion processing, an accurate display is performed for the reference white color. With this, it is possible to prevent a viewer of an image from having a feeling of strangeness due to the conversion processing performed to color data.

According to the eleventh aspect of the present invention, as for data of memory colors, display is performed based on the data after the predetermined conversion processing is performed to the inputted data. Therefore, by taking a configuration in which processing for displaying colors accurate to colors represented by the inputted data is performed as the predetermined conversion processing, colors accurate to colors represented by the inputted data are displayed for memory colors. With this, it is possible to prevent a viewer of an image from having a feeling of strangeness due to the conversion processing performed to color data.

According to the twelfth aspect of the present invention, there is realized the display apparatus including the image processing device providing the same effect as that of any of the first to the eleventh aspects of the present invention.

BRIEF DESCRIPTION OF THE DRAWINGS

FIG. 13 is a table illustrating one example of a look-up table in a modified example according to the embodiments.

FIG. 18 is an xy chromaticity diagram for describing white balance processing.

FIG. 19 is a diagram for describing a difference between an xyY color space of the panel and an xyY color space obtained by white balance processing.

MODE FOR CARRYING OUT THE INVENTION

<1. General Description of Processing>

First, an approach for image processing according to the present invention will be described. As described above, so-called memory colors such as white color and flesh color should be displayed accurately to inputted video signals. These memory colors are distributed in one region centering white color on an xy chromaticity diagram in an XYZ color space. Therefore, in the present invention, a boundary line including memory colors therein is virtually provided on the xy chromaticity diagram, and data is converted such that colors within the boundary line are displayed accurately to the inputted video signals. On the other hand, as for colors outside the boundary line, data is converted so as to use, on the xy chromaticity diagram, colors of a further outward side (to use colors of a wider range). In order to realize such data conversion, as for colors outside the boundary line, an index value representing a positional relation among a "chromaticity coordinate of relevant color", a "color reproduction range as a reference of inputted video signals", and the "boundary line" is obtained. More specifically, an index value that indicates a degree of closeness of a position of the "chromaticity coordinate of relevant color" to an outline of the "color reproduction range as a reference of inputted video signals" from the "boundary line" is obtained. This index value is not less than 0 and not more than 1, and the index value is 0 for colors on the boundary line, and the index value is 1 for colors on the outline of the color reproduction range as a reference of inputted video signals. Then, the index value is used as a weighting factor for performing weighting processing to data when data conversion from an inputted video signal (RGB signal) to an RGB signal for the panel is performed. To be more specific, the weighting processing is performed based on the weighting factor to RGB data obtained through conversion processing that has been conventionally employed and to RGB data of the inputted video signal itself, and then data obtained by adding the data subjected to the weighting processing is supplied to the panel.

Figure 2:
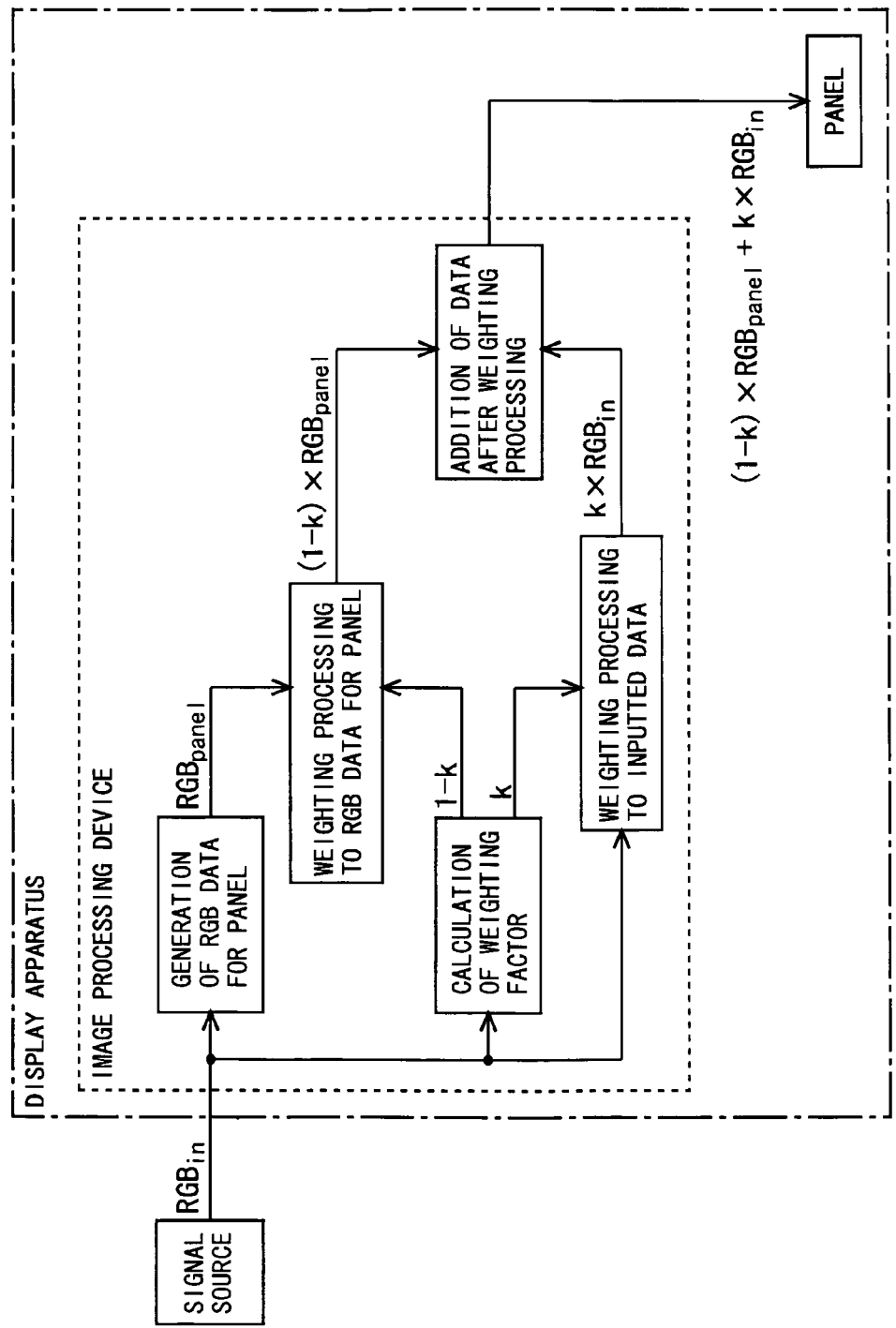
FIG. 2 is a block diagram for describing an outline of image processing according to the present invention.

FIG. 2 is a block diagram for describing an outline of the image processing according to the present invention. An image processing device generates RGB data $RGB_{panel}$ for a panel by performing conversion processing (such as color gamut conversion processing and white balance processing) that has conventionally been employed to RGB data $RGB_{in}$ supplied from an external signal source. As used herein, the "RGB data $RGB_{panel}$ for a panel" is data with which, when supplied to the panel, color accurate to the inputted video signal (the RGB data $RGB_{in}$ supplied from the external signal source) can be displayed in this panel.

Further, the image processing device calculates a weighting factor k as described above. In this case, the RGB data $RGB_{panel}$ for the panel is subjected to weighting processing taking (1−k) as the factor. Meanwhile, the inputted video signal (the RGB data $RGB_{in}$) is subjected to weighting processing taking k as the factor. Then, "(1−k)×$RGB_{panel}$" and "k×$RGB_{in}$" which are the data generated through the weighting processing are added, thereby generating RGB data that is actually supplied to the panel. Subsequently, as shown in FIG. 2, "(1−k)×$RGB_{panel}$+k×$RGB_{in}$" which is the data after the addition is supplied to the panel.

Figure 3:
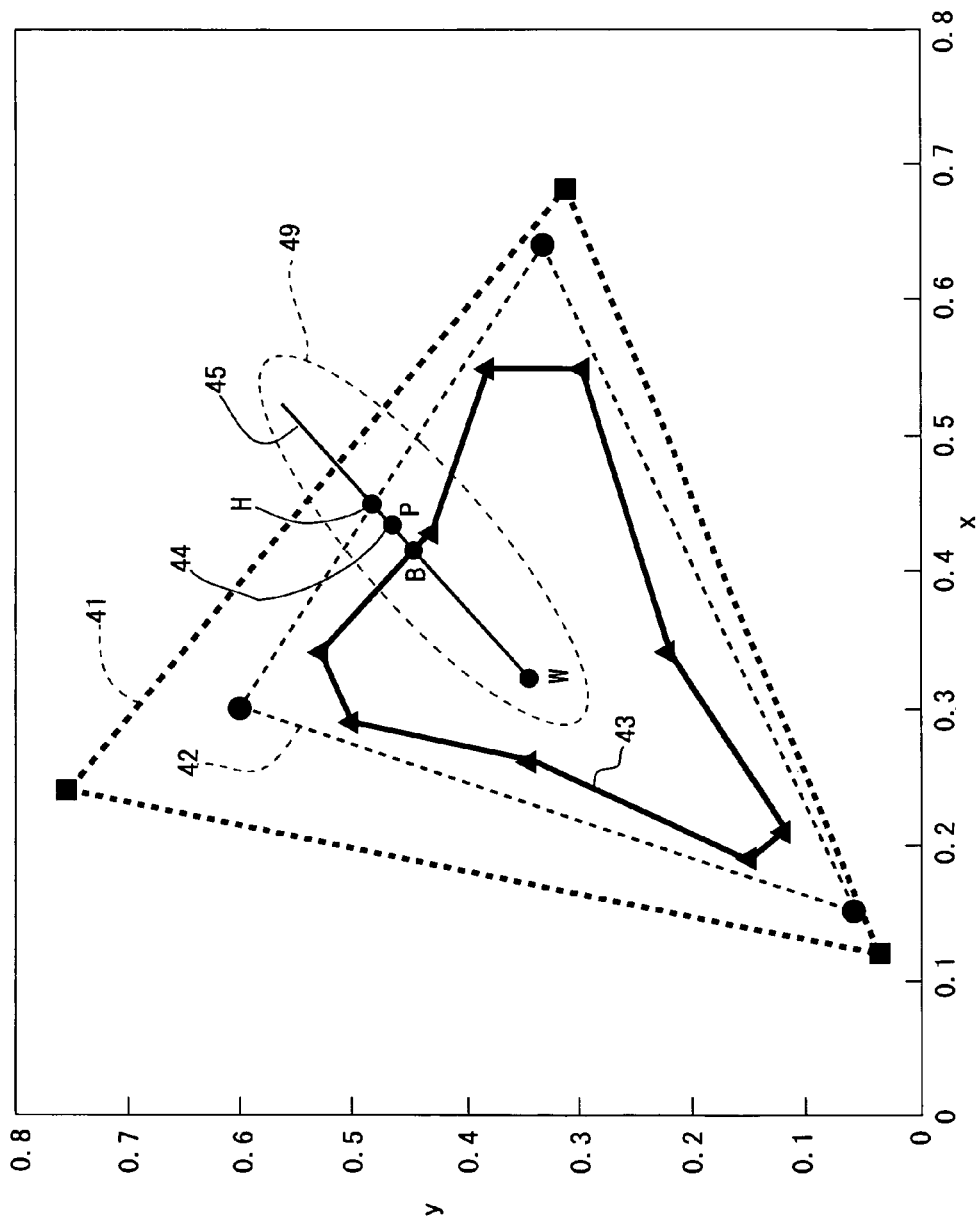
FIG. 3 is an xy chromaticity diagram for describing an outline of the image processing according to the present invention.

In the meantime, according to the present invention, when calculating the weighting factor k, the externally supplied RGB data is converted into XYZ data (image data in an XYZ colorimetric system), and an xyY color space is utilized based on the XYZ data. FIG. 3 is an xy chromaticity diagram for describing an outline of the image processing according to the present invention. In FIG. 3, a heavy dotted line represented by a reference numeral 41 indicates (an outline of) a color reproduction range of the panel, and a fine dotted line represented by a reference numeral 42 indicates (an outline of) a color reproduction range based on the HDTV standard. As can be seen from FIG. 3, a color reproduction range 41 of the panel is wider than a color reproduction range 42 based on the HDTV standard. In this case, in the image processing according to the present invention, a boundary line such as a heavy solid line represented by a reference numeral 43 in FIG. 3 is virtually provided on the xy chromaticity diagram as described above. The boundary line 43 provided on the xy chromaticity diagram passes at least three points, defining a closed region. In the example shown in FIG. 3, the boundary line 43 is configured as an enneagon. Accordingly, as equations representing the boundary line 43, equations that express nine line segments are previously defined. Moreover, 0 is taken as the weighting factor k for color within the boundary line 43, and as can be seen from FIG. 2, the RGB data $RGB_{panel}$ for the panel is supplied as it is to the panel. On the other hand, as for color outside the boundary line 43, combined data of data obtained through weighting processing to the RGB data $RGB_{panel}$ for the panel taking (1−k) as the factor and data obtained through weighting processing to an inputted video signal (the. RGB data $RGB_{in}$) taking k as the factor is supplied to the panel.

Next, calculation of the weighting factor k will be described. It is assumed that a chromaticity coordinate (x, y) of color of a pixel contained within the externally supplied RGB data $RGB_{in}$ (hereinafter referred to as a "target pixel") on the xy chromaticity diagram is a point P represented by a reference numeral 44 in FIG. 3. First, an equation (hereinafter referred to as a "weighting factor calculation line") for a line 45 passing through a white point (D65 in the case of the HDTV standard, and referred to as a "point W") and the point P is obtained. Then, a chromaticity coordinate for an intersection point ("point H") between the weighting factor calculation line 45 and the outline of the color reproduction range 42 based on the HDTV standard is obtained. Further, a chromaticity coordinate for an intersection point ("point B") between the weighting factor calculation line 45 and the boundary line 43 is obtained. Next, after calculating a length of a line segment BP and a length of a line segment BH, the weighting factor k is obtained by dividing the length of the line segment BP by the length of the line segment BH. It should be noted that when the chromaticity coordinate of the target pixel is within the boundary line 43, 0 is taken as the weighting factor k as described above.

With this in mind, embodiments of the present invention will now be described with reference to the accompanying drawings.

<2. First Embodiment>
<2.1 Configuration of Display Apparatus and General Description of Operation>

Figure 1:
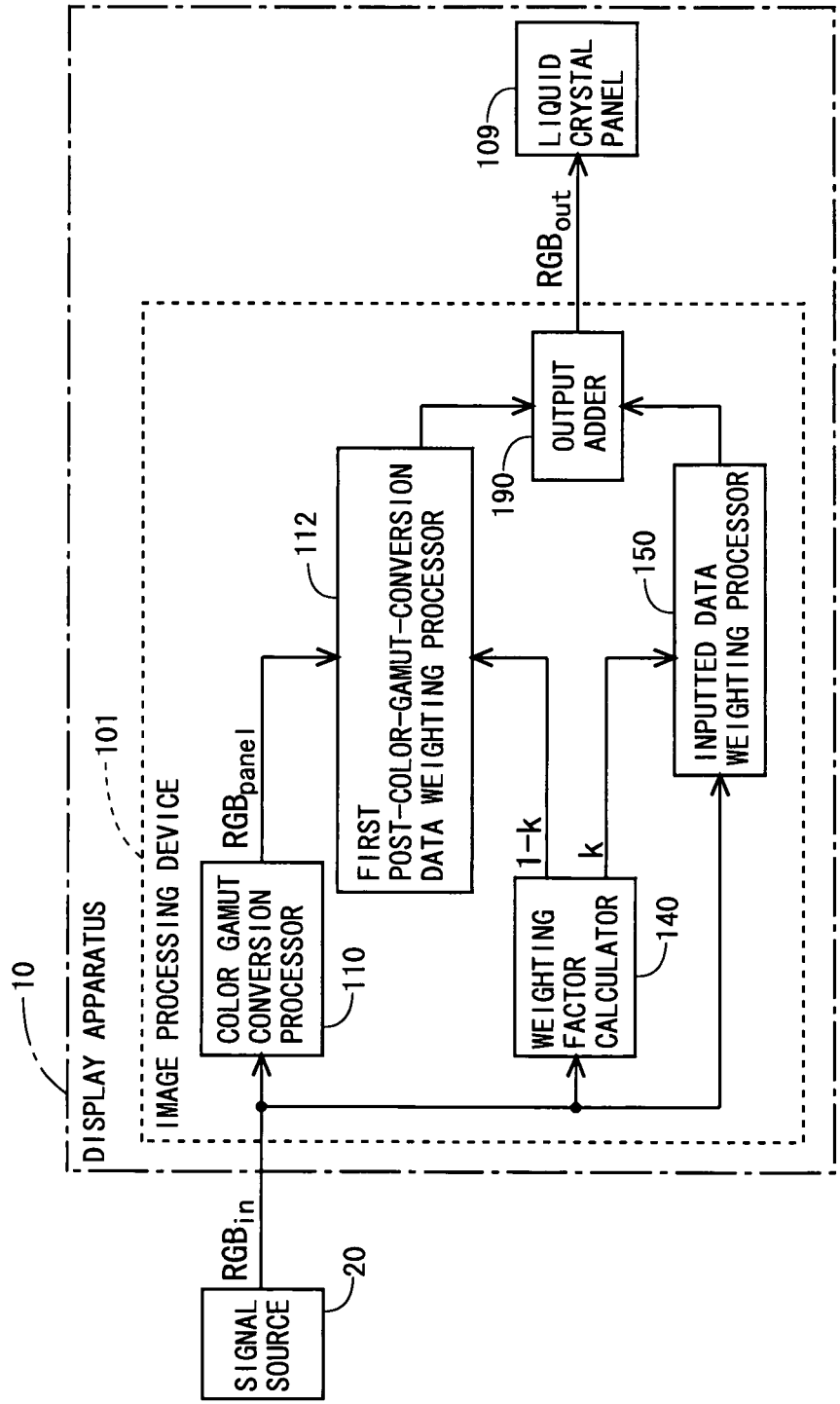
FIG. 1 is a block diagram illustrating a configuration of a display apparatus according to a first embodiment of the present invention.
Figures 15, 16:
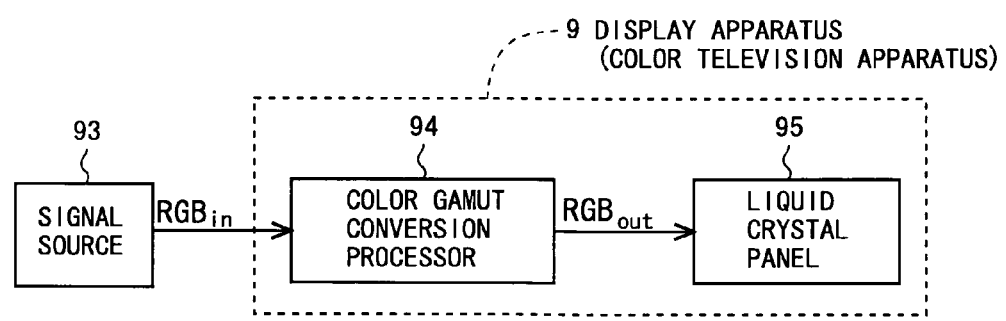
FIG. 15 is a table showing chromaticity coordinate values of primary colors in the HDTV standard and chromaticity coordinate values of primary colors in a liquid crystal panel that constitutes a display apparatus (color television apparatus).
FIG. 16 is a block diagram illustrating an example of a configuration of a display apparatus according to the conventional example.
Figure 17:
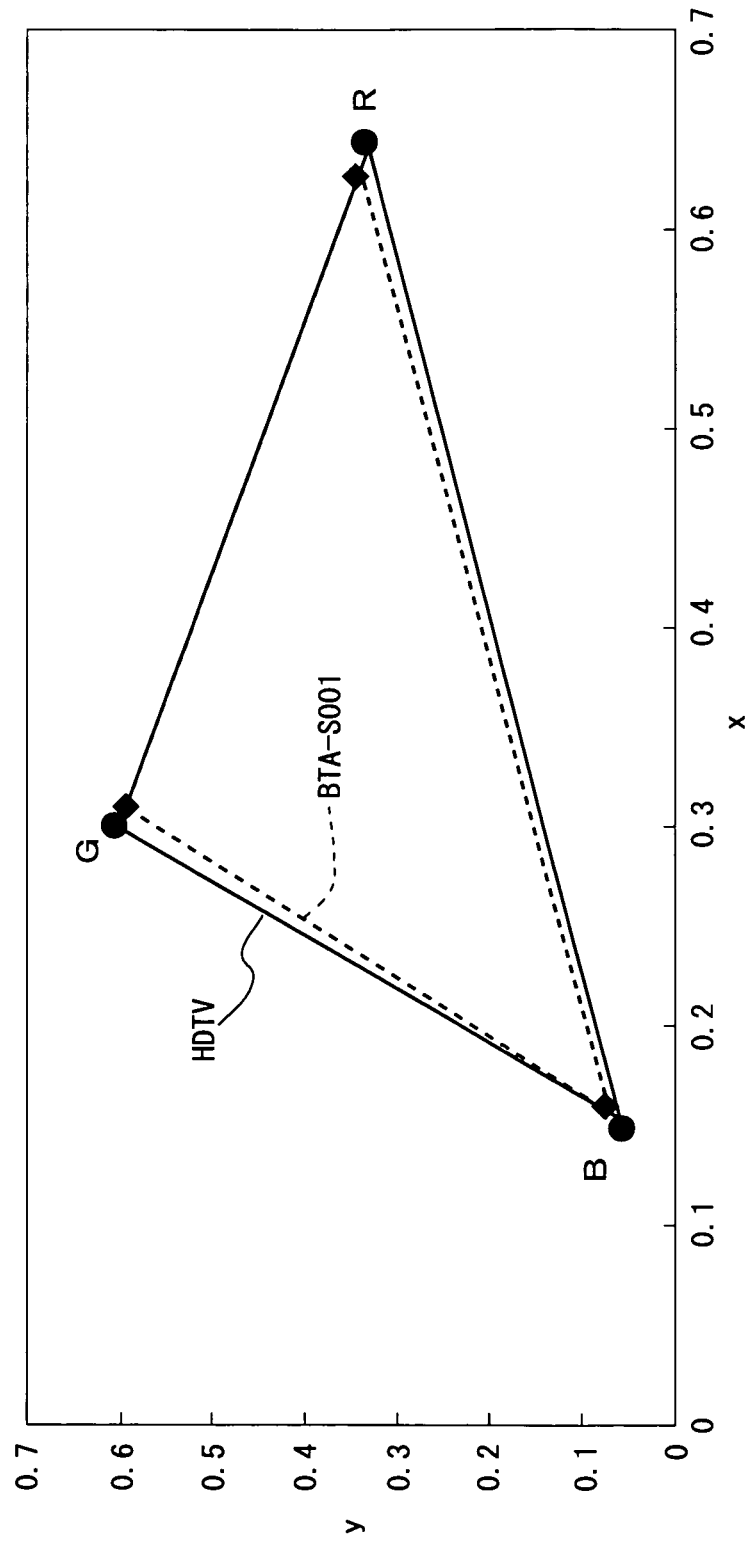
FIG. 17 is an xy chromaticity diagram for describing the conventional example.

FIG. 1 is a block diagram illustrating a configuration of a display apparatus according to a first embodiment of the present invention. As shown in FIG. 1, this display apparatus 10 is configured by an image processing device 101 and a liquid crystal panel 109. The image processing device 101 serves to convert, according to a primary color chromaticity coordinate of the liquid crystal panel 109, RGB data $RGB_{in}$ in the HDTV standard supplied from an external signal source 20 (hereinafter also simply referred to as "inputted data") into RGB data $RGB_{out}$ to be supplied to the liquid crystal panel 109. The liquid crystal panel 109 displays an image in a display portion (not shown) by applying voltages based on the RGB data $RGB_{out}$ supplied from the image processing device 101 to a liquid crystal layer. Note that it is assumed that a chromaticity coordinate value of primary color of the liquid crystal panel 109 used in this embodiment is as represented by a reference numeral 92 in FIG. 15.

The image processing device 101 includes, as shown in FIG. 1, a color gamut conversion processor 110, a first post-color-gamut-conversion data weighting processor 112, a weighting factor calculator 140, an inputted data weighting processor 150, and an output adder 190. The color gamut conversion processor 110 converts the RGB data $RGB_{in}$ in the HDTV standard transmitted from the external signal source 20 into the RGB data $RGB_{panel}$ for the liquid crystal panel 109 based on the equation (3). The weighting factor calculator 140 calculates a weighting factor k for data of each pixel included in the inputted data. The weighting factor calculator 140 also obtains, based on the weighting factor k, a factor (hereinafter referred to as a "first factor") $k_1$ to be used in weighting processing by the inputted data weighting processor 150, and a factor (hereinafter referred to as a "second factor") $k_2$ to be used in weighting processing by the first post-color-gamut-conversion data weighting processor 112. It should be noted that, in this embodiment, the first factor $k_1$ is obtained based on a following equation (4) and the second factor $k_2$ is obtained based on a following equation (5).

$$k_1 = k \quad (4)$$

$$k_2 = 1 - k \quad (5)$$

The first post-color-gamut-conversion data weighting processor 112 performs weighting processing to the RGB data $RGB_{panel}$ that has been generated through the conversion processing by the color gamut conversion processor 110. To be more specific, the first post-color-gamut-conversion data weighting processor 112 generates new data by multiplying a value of the RGB data $RGB_{panel}$ by the second factor $k_2$. The inputted data weighting processor 150 performs weighting processing to the inputted data $RGB_{in}$. To be more specific, the inputted data weighting processor 150 generates new data by multiplying a value of the inputted data $RGB_{in}$ by the first factor $k_1$. The output adder 190 generates new data by adding the data after the weighting processing by the first post-color-gamut-conversion data weighting processor 112 and the data after the weighting processing by the inputted data weighting processor 150. Then, the RGB data $RGB_{out}$ generated through adding processing by the output adder 190 is supplied to the liquid crystal panel 109.

It should be noted that, in this embodiment, an RGB data converter is realized by the color gamut conversion processor 110, a first weighting processor is realized by the inputted data weighting processor 150, and a second weighting processor is realized by the first post-color-gamut-conversion data weighting processor 112. Further, first RGB data is realized by the RGB data $RGB_{in}$, and second RGB data is realized by the RGB data $RGB_{panel}$.

<2.2 Sequence of Image Processing>

Figure 4:
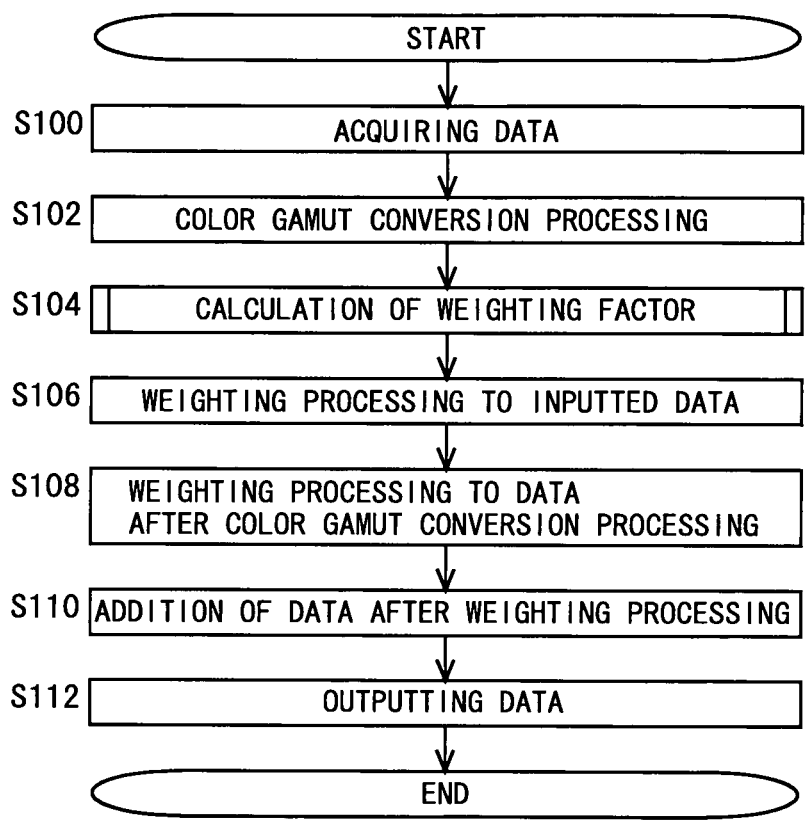
FIG. 4 is a flowchart showing a sequence of the image processing according to the first embodiment.

Next, a sequence of image processing according to this embodiment will be described. FIG. 4 is a flowchart showing a sequence of the image processing according to this embodiment. Note that FIG. 4 shows a sequence when focusing on data of a single pixel (target pixel) included in the inputted data.

First, the image processing device 101 receives the RGB data RGB$_{in}$ in the HDTV standard transmitted from the external signal source 20, and acquires data of each pixel (target pixel) (step S100). The data of the target pixel acquired in this step S100 is supplied to the color gamut conversion processor 110, the weighting factor calculator 140, and the inputted data weighting processor 150. Then, data conversion from the RGB data RGB$_{in}$ in the HDTV standard into the RGB data RGB$_{panel}$ for the liquid crystal panel 109 is performed by the color gamut conversion processor 110 (step S102). The data conversion in this step S102 is performed based on the equation (3).

Figure 5:
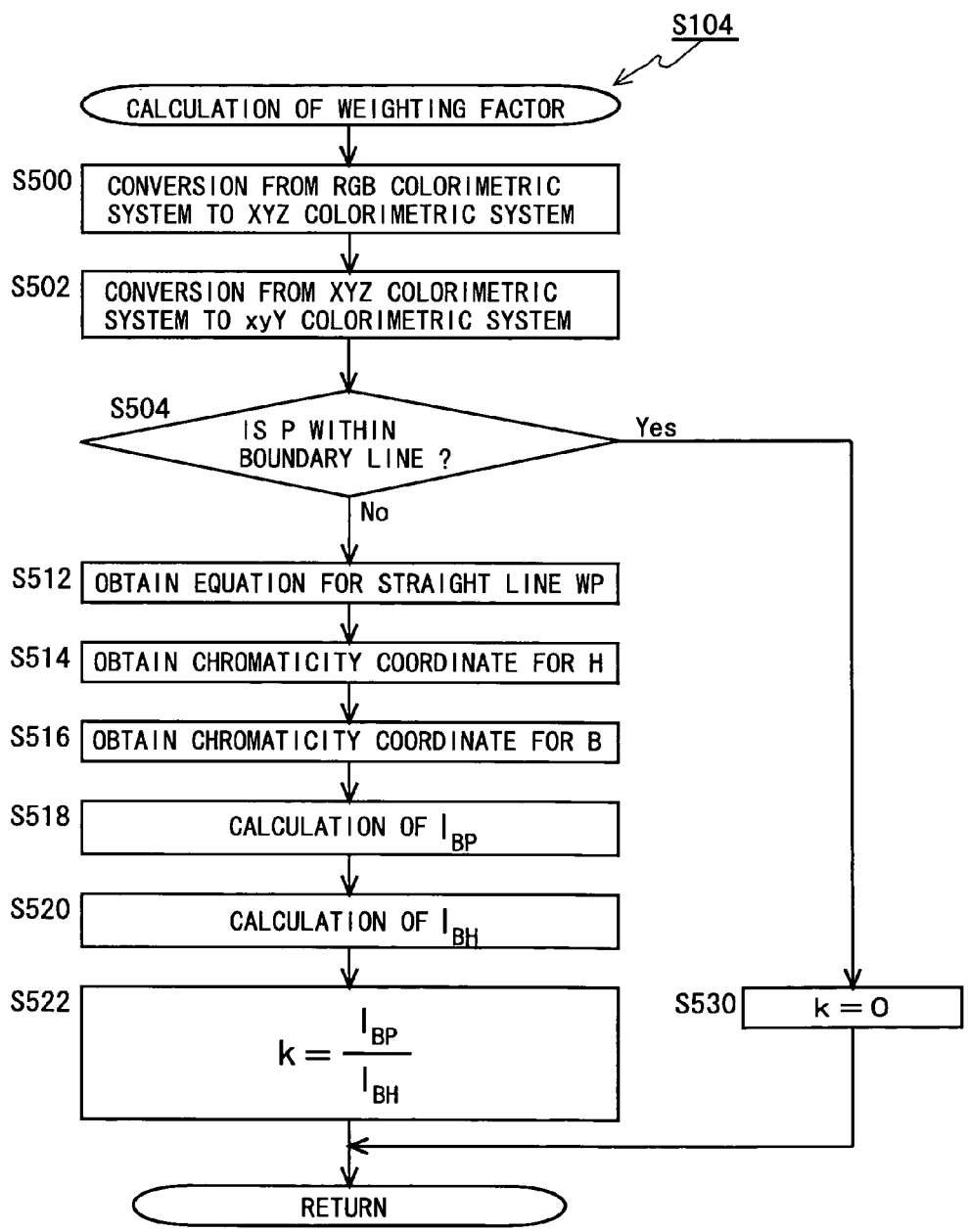
FIG. 5 is a flowchart showing a sequence of calculation of a weighting factor according to the first embodiment.
Figure 6:
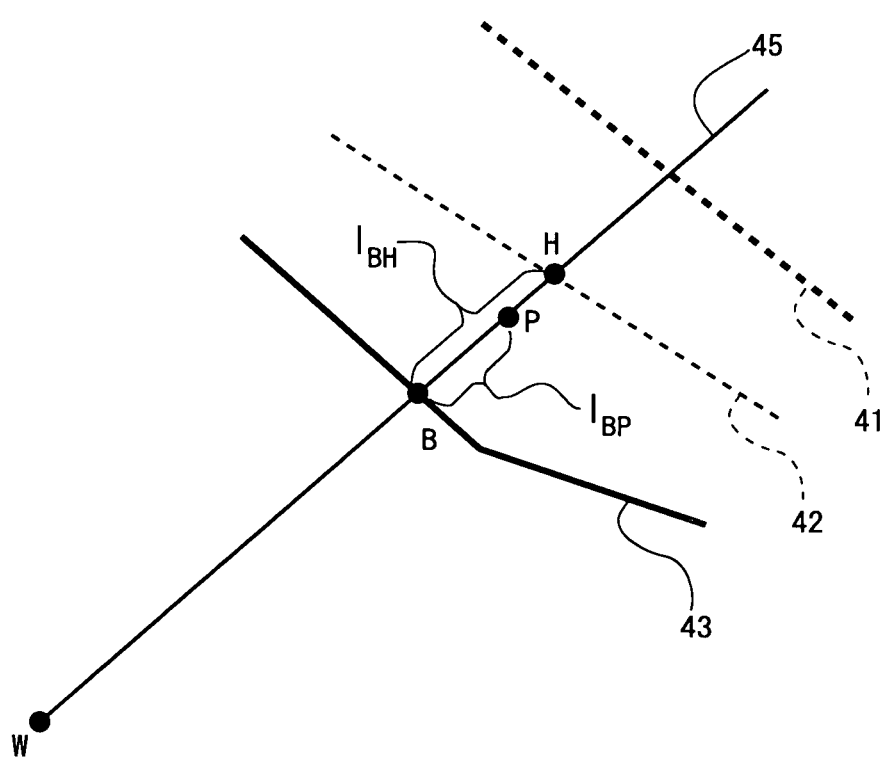
FIG. 6 is an enlarged view of a region represented by a reference numeral 49 in FIG. 3.

Next, calculation of the weighting factor k is performed by the weighting factor calculator 140 (step S104). The calculation of the weighting factor k will be described in detail with reference to FIG. 5 and FIG. 6. Note that FIG. 5 is a flowchart showing a sequence of the calculation of the weighting factor k, and FIG. 6 is an enlarged view of a region represented by a reference numeral 49 in FIG. 3. First, the weighting factor calculator 140 receives the RGB data RGB$_{in}$ which is data in an RGB colorimetric system, and performs data conversion from the RGB colorimetric system into an XYZ colorimetric system (step S500). The data conversion in this step S500 is performed based on the equation (1). Subsequently, the weighting factor calculator 140 performs data conversion from the XYZ colorimetric system into an xyY colorimetric system (step S502). The data conversion in this step S502 is performed based on following equations (6) and (7).

$$x = X/(X+Y+Z) \quad (6)$$

$$y = Y/(X+Y+Z) \quad (7)$$

With this, a chromaticity coordinate point (hereinafter referred to as an "input data chromaticity coordinate point") for color of the target pixel on the xy chromaticity diagram is obtained. Note that the input data chromaticity coordinate point is taken as a point P shown in FIG. 6. However, the point P can be present within the boundary line 43 (closer to the point W).

Next, the weighting factor calculator 140 determines whether or not the input data chromaticity coordinate point (point P) is within the boundary line 43 (step S504). As a result of the determination in step S504, if the input data chromaticity coordinate point is within the boundary line 43, the process proceeds to step S530, and if the input data chromaticity coordinate point is not within the boundary line 43, the process proceeds to step S512. In step S530, the weighting factor calculator 140 determines the weighting factor k for the data of the target pixel to be 0.

In step S512, the weighting factor calculator 140 obtains an equation expressing a weighting factor calculation line 45 which is a straight line that passes the white point (point W) and the point P. Next, the weighting factor calculator 140 obtains a chromaticity coordinate of the intersection point (point H) between the weighting factor calculation line 45 and the outline of the color reproduction range 42 based on the HDTV standard (step S514), and then further obtains a chromaticity coordinate of the intersection point (point B) between the weighting factor calculation line 45 and the boundary line 43 (step S516). Subsequently, the weighting factor calculator 140 obtains a length l$_{BP}$ of the line segment BP based on the chromaticity coordinates of the point B and the point P (step S518), and then further obtains a length l$_{BH}$ of the line segment BH based on the chromaticity coordinates of the point B and the point H (step S520). Then, the weighting factor calculator 140 calculates, as shown by a following equation (8), the weighting factor k for the data of the target pixel by dividing l$_{BP}$ by l$_{BH}$ (step S522).

$$k = l_{BP}/l_{BH} \quad (8)$$

Note that, in this embodiment, the point P corresponds to a first coordinate, the point H corresponds to a second coordinate, the point B corresponds to a third coordinate, and the point W corresponds to a reference coordinate.

After completing step S522 or step S530, the process proceeds to step S106 in FIG. 4. As described above, for the color whose input data chromaticity coordinate point is within the boundary line 43 provided on xy chromaticity diagram, 0 is taken as the weighting factor k. Further, for the color whose input data chromaticity coordinate point is outside the boundary line 43, the value corresponding to the positional relation among "the chromaticity coordinate", "the outline of the color reproduction range 42 based on the HDTV standard", and "the boundary line 43" is taken as the weighting factor k.

After completing the calculation of the weighting factor k, the inputted data weighting processor 150 performs weighting processing to the inputted data RGB$_{in}$ (step S106 in FIG. 4). With this, data obtained by multiplying the value of the inputted data RGB$_{in}$ by the first factor k$_1$ (=k) is outputted from the inputted data weighting processor 150. In this step S108, the first post-color-gamut-conversion data weighting processor 112 performs weighting processing to the RGB data RGB$_{panel}$ that has been generated in the process of step S102. With this, data obtained by multiplying the value of the RGB data RGB$_{panel}$ by the second factor k$_2$ (=1−k) is outputted from the first post-color-gamut-conversion data weighting processor 112.

In step S110, the output adder 190 adds the data that has been generated in the process of step S106 and the data that has been generated in the process of step S108. Then, the output adder 190 supplies the data RGB$_{out}$ after the addition to the liquid crystal panel 109 (step S112).

As described above, for the data of a single pixel included in the inputted data, the conversion processing from the RGB data RGB$_{in}$ in the HDTV standard into the RGB data RGB$_{OUT}$ to be supplied to the liquid crystal panel 109 is performed. It should be noted that this conversion processing is expressed by a following equation (9).

[Equation 4]

$$\begin{pmatrix} R \\ G \\ B \end{pmatrix}_{OUT} = (1-k) \times \begin{pmatrix} R \\ G \\ B \end{pmatrix}_{panel} + k \times \begin{pmatrix} R \\ G \\ B \end{pmatrix}_{IN} \quad (9)$$

<2.3 Effects>

According to this embodiment, depending on whether the chromaticity coordinate point (input data chromaticity coordinate point) of the color represented by the inputted data on the xy chromaticity diagram is within or outside the boundary line 43 that has been previously provided (on the xy chromaticity diagram), conversion processing of a different type is performed to the data of the relevant color.

When the input data chromaticity coordinate point is outside the boundary line 43, the weighting processing is performed to the data after the color gamut conversion processing and to the inputted data based on the weighting factor k that is determined depending on the positional relation, on the xy chromaticity diagram, among "the chromaticity coordinate of the color represented by the inputted data", "the outline of the color reproduction range 42 as a reference of the inputted data", and "the previously defined boundary line 43", and the combined data of them is supplied to the liquid crystal panel 109. At this time, as the chromaticity coordinate of the color represented by the inputted data is closer to the previously provided boundary line 43, a relatively heavier weight is given to the data after the color gamut conversion processing. Further, as the chromaticity coordinate of the color represented by the inputted data is closer to the outline of the color reproduction range 42 as a reference of the inputted data, a relatively heavier weight is given to the inputted data.

For example, in the liquid crystal panel 109 capable of gradation display in 256 gray scale levels, it is assumed that a gray scale level "255" is converted into "200" based on the equation (3). At this time, if the chromaticity coordinate of the color represented by the inputted data is on the outline of the color reproduction range 42 as a reference of the inputted data, the weighting factor k is "1", and a value OUT of the data to be supplied to the liquid crystal panel 109 is "255" as expressed by a following equation (10).

$$OUT=(1-1)\times 200+1\times 255=255 \qquad (10)$$

Further, if the chromaticity coordinate of the color represented by the inputted data is between the outline of the color reproduction range 42 as a reference of the inputted data and the boundary line 43, the weighting factor k is "0.5", and the value OUT of the data to be supplied to the liquid crystal panel 109 is "228" as expressed by a following equation (11).

$$OUT=(1-0.5)\times 200+0.5\times 255=228 \qquad (11)$$

Moreover, if the chromaticity coordinate of the color represented by the inputted data is on the boundary line 43, the weighting factor k is "0", and the value OUT of the data to be supplied to the liquid crystal panel 109 is "200" as expressed by a following equation (12).

$$OUT=(1-0)\times 200+0\times 255=200 \qquad (12)$$

As described above, when the input data chromaticity coordinate point is outside the boundary line 43, the value OUT of the data to be supplied to the liquid crystal panel 109 is determined so as to use, on the xy chromaticity diagram, colors of a further outward side (to use colors of a wider range). With this, in the liquid crystal panel 109, image display taking maximum advantage of the color reproduction is performed.

In contrast, when the input data chromaticity coordinate point is within the boundary line 43, conversion is not performed to the value of the data in the xyY color space, and colors accurate to colors represented by the inputted data are displayed in the display portion of the liquid crystal panel 109. Therefore, by defining the boundary line 43 so as to include so-called memory colors such as white color and flesh color, it is possible to display colors accurate to colors represented by the inputted data for memory colors.

As described above, in the display apparatus, it is possible to perform image display taking full advantage of a color reproduction performance of the panel without providing a viewer with a feeling of strangeness.

Figure 7:
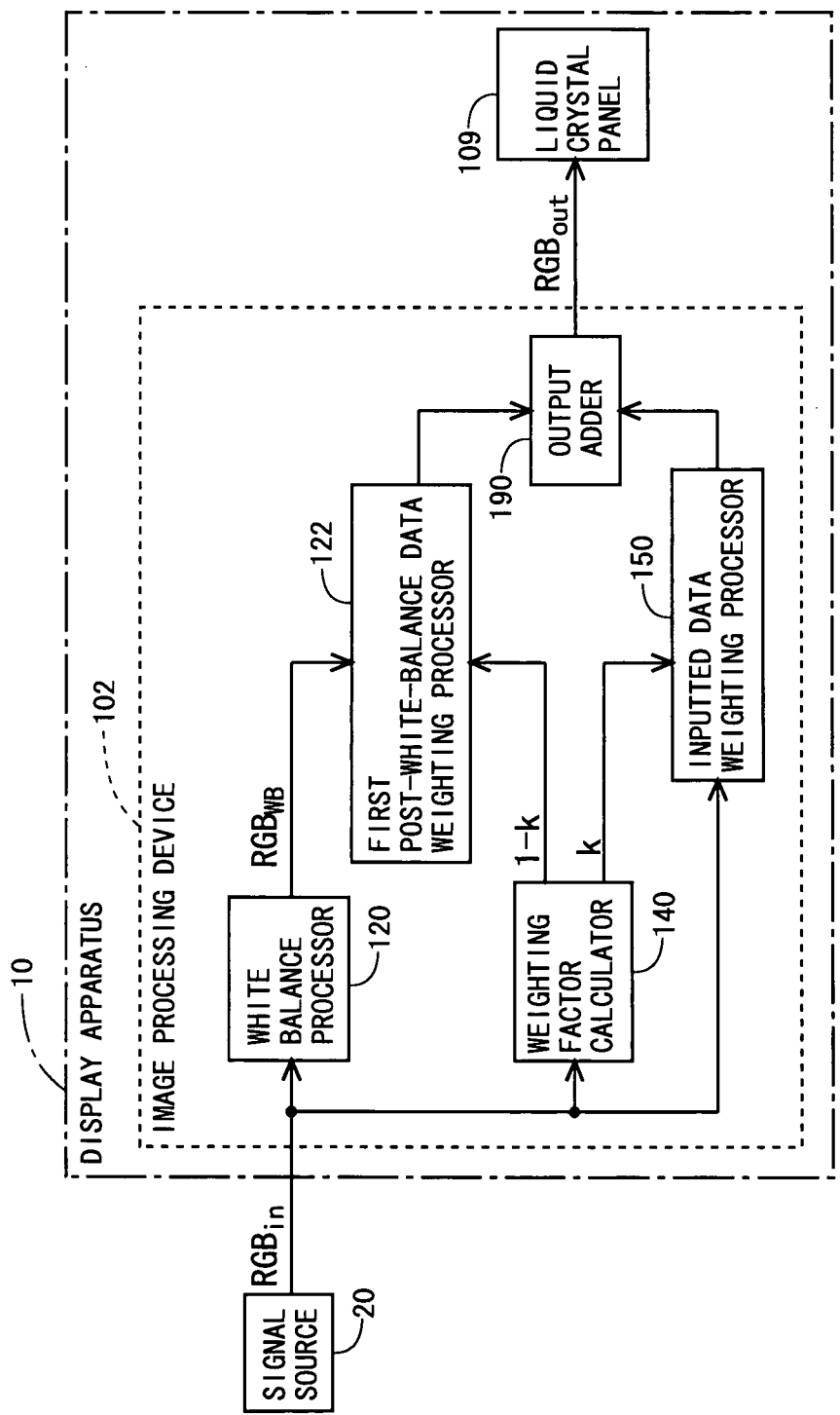
FIG. 7 is a block diagram illustrating a configuration of a display apparatus according to a second embodiment of the present invention.

<3. Second Embodiment>
<3.1 Configuration of Display Apparatus and General Description of Operation>
FIG. 7 is a block diagram illustrating a configuration of a display apparatus according to a second embodiment of the present invention. In this embodiment, an image processing device 102 is provided with a white balance processor 120 in place of the color gamut conversion processor 110 according to the first embodiment, and a first post-white-balance data weighting processor 122 in place of the first post-color-gamut-conversion data weighting processor 112 according to the first embodiment. Since other features are similar to those of the first embodiment, a description thereof is omitted.

The white balance processor 120 performs white balance processing to the RGB data $RGB_{in}$ in the HDTV standard transmitted from the external signal source 20. The white balance processing is performed, as shown by following equations (13) to (15), by multiplying each color value of the RGB data $RGB_{in}$ by a gain that has been previously determined for the color.

$$R_{WB} = Gain_R \times R_{IN} \qquad (13)$$

$$G_{WB} = Gain_G \times G_{IN} \qquad (14)$$

$$B_{WB} = Gain_B \times B_{IN} \qquad (15)$$

Here, $R_{WB}$, $G_{WB}$, and $B_{WB}$ respectively are values of R (red), G (green), and B (blue) after the white balance processing, $Gain_R$, $Gain_G$, and $Gain_B$ respectively are gains for R (red), G (green), and B (blue), and $R_{IN}$, $G_{IN}$, and $B_{IN}$ respectively are values of R (red), G (green), and B (blue) before the white balance processing.

The first post-white-balance data weighting processor 122 performs weighting processing to the RGB data $RGB_{WB}$ that has been generated through the conversion processing by the white balance processor 120. To be more specific, the first post-white-balance data weighting processor 122 generates new data by multiplying the value of the RGB data $RGB_{WB}$ by the second factor $k_2$. Note that similarly to the first embodiment, a value of the second factor $k_2$ is "1–k".

It should be noted that, in this embodiment, an RGB data converter is realized by the white balance processor 120, and a second weighting processor is realized by the first post-white-balance data weighting processor 122.

Figure 8:
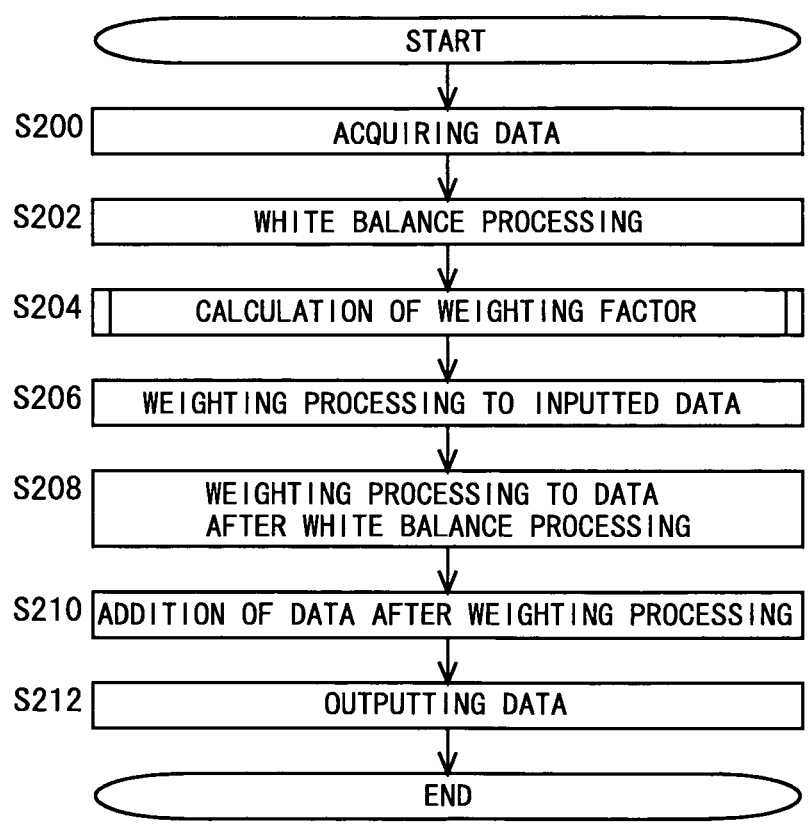
FIG. 8 is a flowchart showing a sequence of the image processing according to the second embodiment.

<3.2 Sequence of Image Processing>
Next, a sequence of image processing according to this embodiment will be described. FIG. 8 is a flowchart showing a sequence of the image processing according to this embodiment. It should be noted that a process similar to the first embodiment will be briefly described.

First, the image processing device 102 receives the externally supplied RGB data $RGB_{in}$, and acquires data of each pixel (target pixel) (step S200). Next, data conversion from the RGB data $RGB_{in}$ in the HDTV standard into the RGB data $RGB_{WB}$ for the liquid crystal panel 109 is performed by the white balance processor 120 (step S202). The data conversion in this step S202 is performed based on the equation (13) to (15).

Next, calculation of the weighting factor k is performed by the weighting factor calculator 140 (step S204). Then, the inputted data weighting processor 150 performs weighting processing to the inputted data $RGB_{in}$ (step S206). Subsequently, the first post-white-balance data weighting processor 122 performs weighting processing to the RGB data $RGB_{WB}$ that has been generated in the process of step S202 (step S208). With this, data obtained by multiplying the value of the RGB data $RGB_{WB}$ by the second factor $k_2$ (=1–k) is outputted from the first post-white-balance data weighting processor 122. Thereafter, the output adder 190 adds the data that has been generated in the process of step S206 and the data that has been generated in the process of step S208 (step S210). Then, the output adder 190 supplies the data $RGB_{out}$ after the addition to the liquid crystal panel 109 (step S212).

As described above, for the data of a single pixel included in the inputted data, the conversion processing from the RGB data $RGB_{in}$ in the HDTV standard into the RGB data $RGB_{OUT}$ to be supplied to the liquid crystal panel 109 is performed. It should be noted that this conversion processing is expressed by a following equation (16).

[Equation 5]

$$\begin{pmatrix} R \\ G \\ B \end{pmatrix}_{OUT} = (1-k) \times \begin{pmatrix} R \\ G \\ B \end{pmatrix}_{WB} + k \times \begin{pmatrix} R \\ G \\ B \end{pmatrix}_{IN} \quad (16)$$

<3.3 Effects>

According to this embodiment, when the input data chromaticity coordinate point is outside the boundary line 43, similarly to the first embodiment, the value of the data to be supplied to the liquid crystal panel 109 is determined so as to use, on the xy chromaticity diagram, colors of a further outward side (to use colors of a wider range). Further, when the input data chromaticity coordinate point is within the boundary line 43, the data subjected to the white balance processing is supplied to the liquid crystal panel 109 as it is, and color based on this data is displayed. As described above, in the display apparatus that enables favorable display only by an adjustment through the white balance (without requiring such as color gamut conversion processing), it is possible to perform image display taking full advantage of the color reproduction performance of the panel without providing a viewer with a feeling of strangeness.

<4. Third Embodiment>
<4.1 Configuration of Display Apparatus and General Description of Operation>

Figure 9:
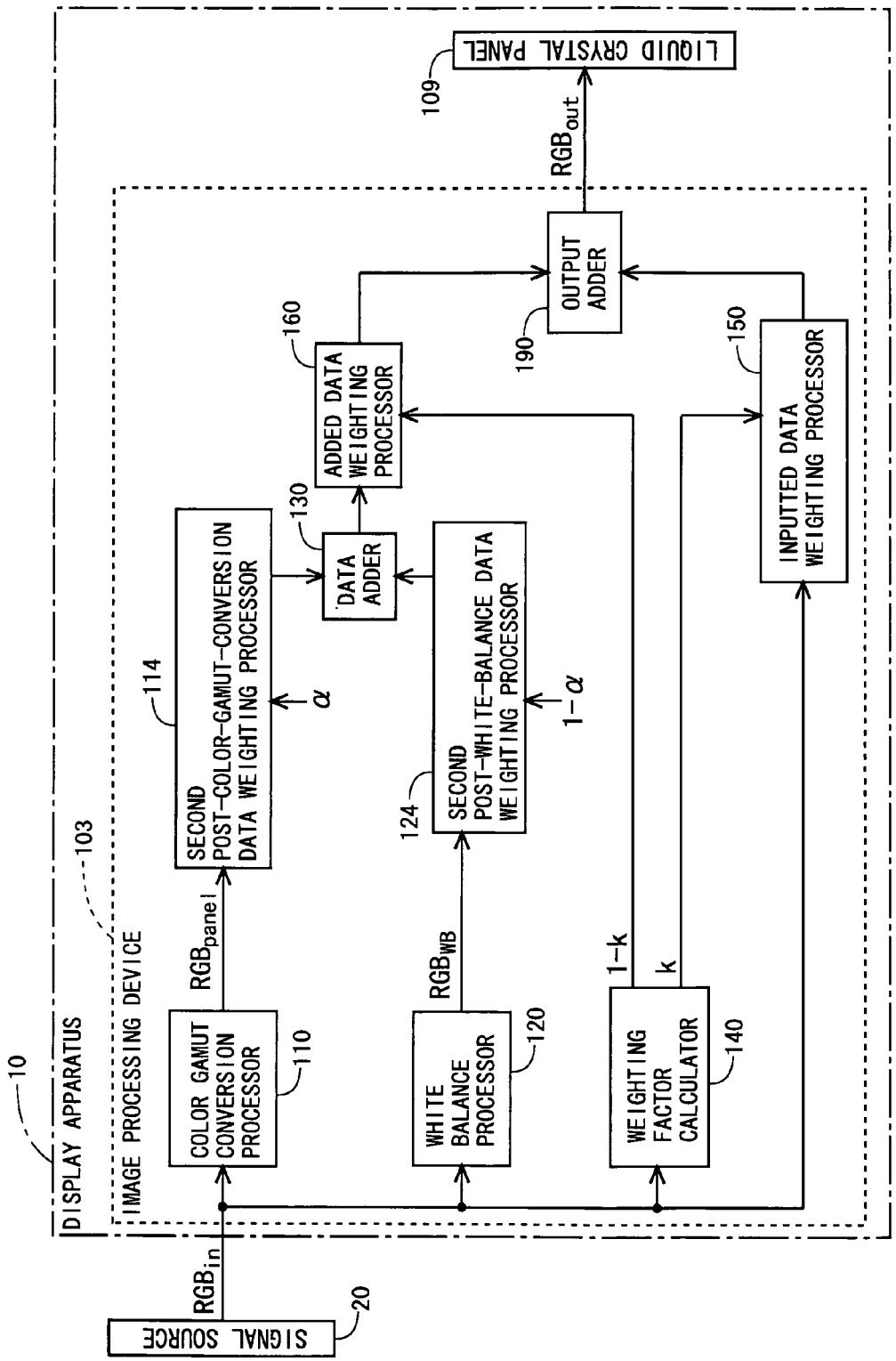
FIG. 9 is a block diagram illustrating a configuration of a display apparatus according to a third embodiment of the present invention.

FIG. 9 is a block diagram illustrating a configuration of a display apparatus according to a third embodiment of the present invention. As shown in FIG. 9, an image processing device 103 according to this embodiment includes a color gamut conversion processor 110, a second post-color-gamut-conversion data weighting processor 114, a white balance processor 120, a second post-white-balance data weighting processor 124, a data adder 130, a weighting factor calculator 140, an inputted data weighting processor 150, an added data weighting processor 160, and an output adder 190.

The color gamut conversion processor 110 converts the RGB data $RGB_{in}$ in the HDTV standard transmitted from the external signal source 20 into the RGB data $RGB_{panel}$ for the liquid crystal panel 109 based on the equation (3). The, second post-color-gamut-conversion data weighting processor 114 performs weighting processing to the RGB data $RGB_{panel}$ that has been generated through the conversion processing by the color gamut conversion processor 110. To be more specific, the second post-color-gamut-conversion data weighting processor 114 generates new data by multiplying a value of the RGB data $RGB_{panel}$ by a third factor a that is previously determined for the RGB data $RGB_{panel}$.

The white balance processor 120 performs white balance processing to the RGB data $RGB_{in}$ in the HDTV standard transmitted from the external signal source 20 based on the equations (13) to (15). The second post-white-balance data weighting processor 124 performs weighting processing to the RGB data $RGB_{WB}$ that has been generated through the conversion processing by the white balance processor 120. To be more specific, the second post-white-balance data weighting processor 124 generates new data by multiplying the value of the RGB data $RGB_{WB}$ by a fourth factor $(1-\alpha)$ that increases and decreases in an manner opposite to the third factor $\alpha$.

The data adder 130 generates new data by adding the data after the weighting processing by the second post-color-gamut-conversion data weighting processor 114 and the data after the weighting processing by the second post-white-balance data weighting processor 124. The weighting factor calculator 140 calculates the weighting factor k for data of each pixel included in the inputted data. The weighting factor calculator 140 also obtains the first factor $k_1$ based on the equation (4), and the second factor $k_2$ based on the equation (5).

The inputted data weighting processor 150 performs weighting processing to the inputted data $RGB_{in}$. To be more specific, the inputted data weighting processor 150 generates new data by multiplying a value of the inputted data $RGB_{in}$ by the first factor $k_1$. The added data weighting processor 160 performs weighting processing to the data obtained through the adding processing by the data adder 130. To be more specific, the added data weighting processor 160 generates new data by multiplying the data obtained through the adding processing by the data adder 130 by the second factor $k_2$. The output adder 190 generates new data by adding the data after the weighting processing by the added data weighting processor 160 and the data after the weighting processing by the inputted data weighting processor 150. Then, the RGB data $RGB_{out}$ generated through adding processing by the output adder 190 is supplied to the liquid crystal panel 109.

The third factor $\alpha$ and the fourth factor $(1-\alpha)$ can be determined to be appropriate values considering the panel properties and human visual features.

It should be noted that, in this embodiment, an RGB data converter is realized by the color gamut conversion processor 110, the second post-color-gamut-conversion data weighting processor 114, the white balance processor 120, the second post-white-balance data weighting processor 124, and the data adder 130. A first weighting processor is realized by the inputted data weighting processor 150. A second weighting processor is realized by the added data weighting processor 160. Further, a third weighting processor is realized by the second post-color-gamut-conversion data weighting processor 114, and a fourth weighting processor is realized by the second post-white-balance data weighting processor 124. Moreover, first RGB data is realized by the RGB data $RGB_{in}$, second RGB data is realized by the data outputted from the data adder 130, third RGB data is realized by the RGB data $RGB_{panel}$ and fourth RGB data is realized by the RGB data $RGB_{WB}$.

<4.2 Sequence of Image Processing>

Figure 10:
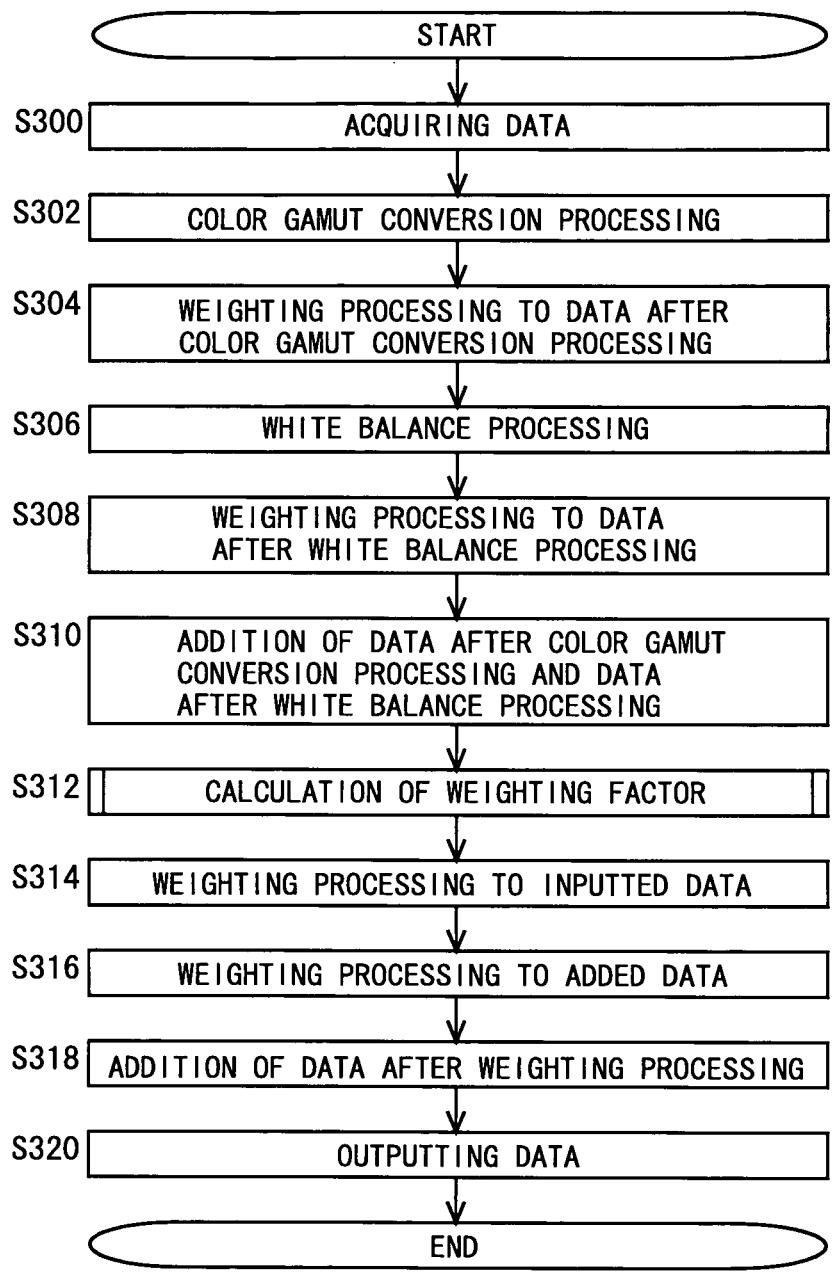
FIG. 10 is a flowchart showing a sequence of the image processing according to the third embodiment.

Next, a sequence of image processing according to this embodiment will be described. FIG. 10 is a flowchart showing a sequence of the image processing according to this embodiment. First, the image processing device 101 receives the RGB data $RGB_{in}$ in the HDTV standard transmitted from the external signal source 20, and acquires data of each pixel (target pixel) (step S300). The data of the target pixel acquired in this step S300 is supplied to the color gamut conversion processor 110, the white balance processor 120, the weighting factor calculator 140, and the inputted data weighting processor 150.

Then, data conversion from the RGB data $RGB_{in}$ in the HDTV standard into the RGB data $RGB_{panel}$ for the liquid crystal panel 109 is performed by the color gamut conversion processor 110 (step S302). The data conversion in this step S302 is performed based on the equation (3). Next, the second post-color-gamut-conversion data weighting processor 114 performs weighting processing to the RGB data $RGB_{panel}$ that has been generated in the process of step S302 (S304). With this, data obtained by multiplying the value of the RGB data $RGB_{panel}$ by the third factor a is outputted from the second post-color-gamut-conversion data weighting processor 114.

Next, data conversion from the RGB data $RGB_{in}$ in the HDTV standard into the RGB data $RGB_{WB}$ for the liquid crystal panel 109 is performed by the white balance processor 120 (step S306). The data conversion in this step S306 is performed based on the equation (13) to (15). Subsequently, the second post-white-balance data weighting processor 124 performs weighting processing to the RGB data $RGB_{WB}$ that has been generated in the process of step S306 (step S308). With this, data obtained by multiplying the value of the RGB data $RGB_{WB}$ by the fourth factor (1−α) is outputted from the second post-white-balance data weighting processor 124.

Thereafter, the data adder 130 adds the data that has been generated in the process of step S304 and the data that has been generated in the process of step S308 (step S310). Next, calculation of the weighting factor k is performed by the weighting factor calculator 140 (step S312). Then, the inputted data weighting processor 150 performs weighting processing to the inputted data $RGB_{in}$ (step S314). With this, data obtained by multiplying the value of the inputted data $RGB_{in}$ by the first factor $k_1$ (=k) is outputted from the inputted data weighting processor 150. Next, the added data weighting processor 160 performs weighting processing to the data that has been generated in the process of step S310 (step S316). With this, data obtained by multiplying the value of the data obtained through the adding processing by the data adder 130 by the second factor $k_2$ (=1−k) is outputted from the added data weighting processor 160.

Next, the output adder 190 adds the data that has been generated in the process of step S314 and the data that has been generated in the process of step S316 (step S318). Then, the output adder 190 supplies the data $RGB_{out}$ after the addition to the liquid crystal panel 109 (step S320).

As described above, for the data of a single pixel included in the inputted data, the conversion processing from the RGB data $RGB_{in}$ in the HDTV standard into the RGB data $RGB_{OUT}$ to be supplied to the liquid crystal panel 109 is performed.

It should be noted that this conversion processing is expressed by a following equation (17).

[Equation 6]

$$\begin{pmatrix} R \\ G \\ B \end{pmatrix}_{OUT} = (1-k) \times \left( \alpha \times \begin{pmatrix} R \\ G \\ B \end{pmatrix}_{panel} + (1-\alpha) \times \begin{pmatrix} R \\ G \\ B \end{pmatrix}_{WB} \right) + k \times \begin{pmatrix} R \\ G \\ B \end{pmatrix}_{IN} \quad (17)$$

<4.3 Effects>

According to this embodiment, when the input data chromaticity coordinate point is outside the boundary line 43, similarly to the first embodiment and the second embodiment, the value of the data to be supplied to the liquid crystal panel 109 is determined so as to use, on the xy chromaticity diagram, colors of a further outward side (to use colors of a wider range). Further, when the input data chromaticity coordinate point is within the boundary line 43, the combined data of the data after the color gamut conversion processing and the data after the white balance processing is supplied to the liquid crystal panel 109, and color based on this data is displayed. As described above, in the display apparatus, it is possible to perform display taking full advantage of the color reproduction performance of the panel for colors other than memory colors, while displaying accurately to colors represented by the inputted data for memory colors by the color gamut conversion processing and the white balance processing.

<5. Fourth Embodiment>
<5.1 Configuration of Display Apparatus and General Description of Operation>

Figure 11:
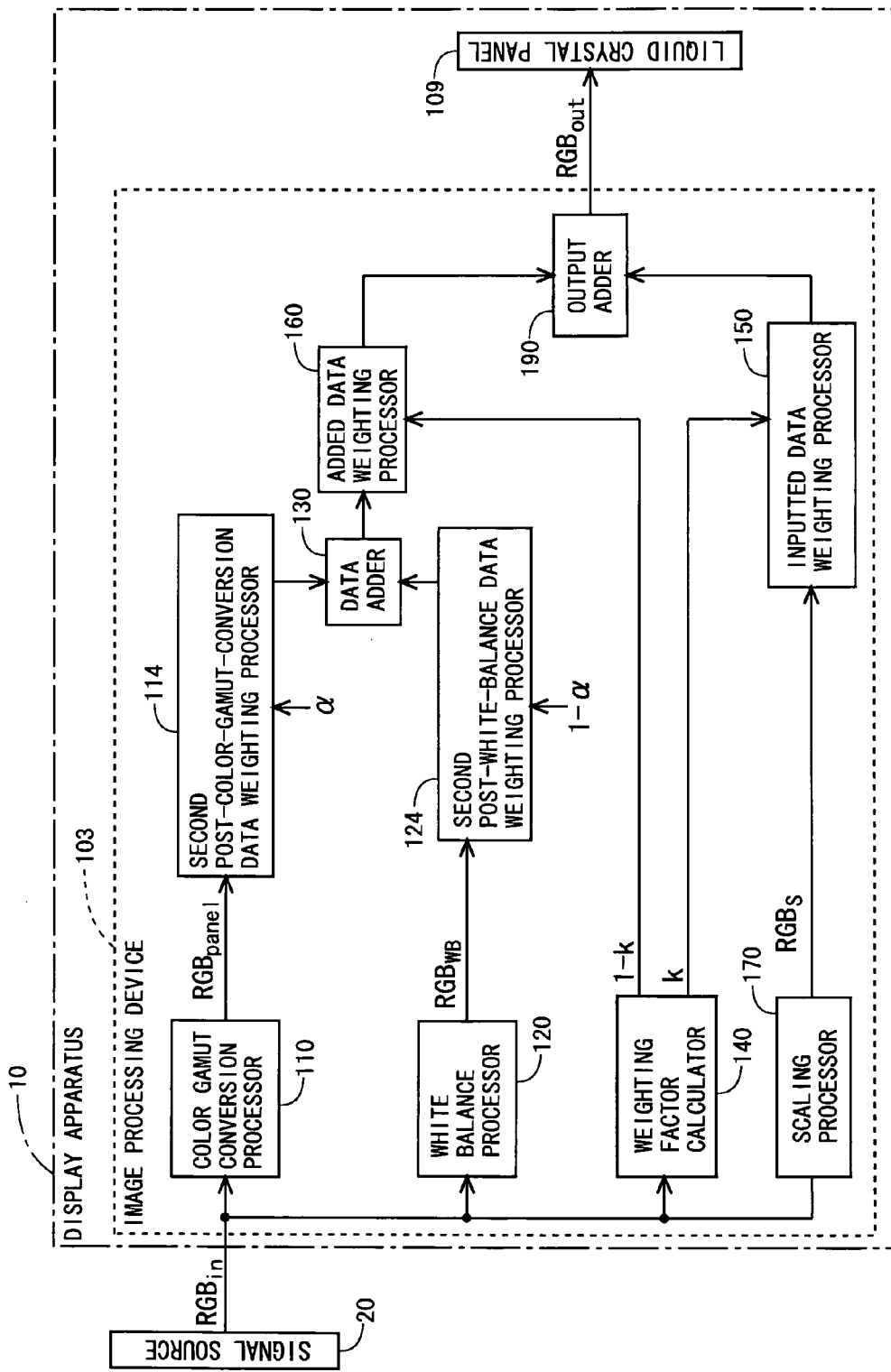
FIG. 11 is a block diagram illustrating a configuration of a display apparatus according to a fourth embodiment of the present invention.

FIG. 11 is a block diagram illustrating a configuration of a display apparatus according to a fourth embodiment of the present invention. As shown in FIG. 11, an image processing device 104 according to this embodiment is provided with a scaling processor 170 and a scaling data weighting processor 180 in place of the inputted data weighting processor 150 according to the third embodiment. Since other features are similar to those of the third embodiment, a description thereof is omitted.

The scaling processor 170 performs scaling processing to the RGB data $RGB_{in}$ in the HDTV standard transmitted from the external signal source 20. It should be noted that the scaling processing refers to a process for adjusting saturation, because saturation of colors to be displayed in the panel often becomes too high if the RGB value of the inputted data is supplied to the panel as it is. The scaling processing is performed, as shown by following equations (18) to (20), by multiplying each color value of the RGB data $RGB_{in}$ by a factor (for scaling processing) that has been previously determined for the color.

$$R_S = S_R \times R_{IN} \quad (18)$$

$$G_S = S_G \times G_{IN} \quad (19)$$

$$B_S = S_B \times B_{IN} \quad (20)$$

Here, $R_S$, $G_S$, and $B_S$ respectively are values of R (red), G (green), and B (blue) after the scaling processing, $S_R$, $S_G$, and $S_B$ are factors for scaling processing respectively for R (red), G (green), and B (blue), and $R_{IN}$, $G_{IN}$, and $B_{IN}$ respectively are values of R (red), G (green), and B (blue) before the scaling processing.

The scaling data weighting processor 180 performs weighting processing to the RGB data $RGB_S$ that has been generated through the scaling processing by the scaling processor 170. To be more specific, the scaling data weighting processor 180 generates new data by multiplying the value of the RGB data $RGB_S$ by the first factor $k_1$. Note that, similarly to the third embodiment, a value of the first factor $k_1$ is k.

It should be noted that, in this embodiment, a fifth weighting processor is realized by the scaling data weighting processor 180, and fifth RGB data is realized by the RGB data $RGB_S$.

<5.2 Sequence of Image Processing>

Figure 12:
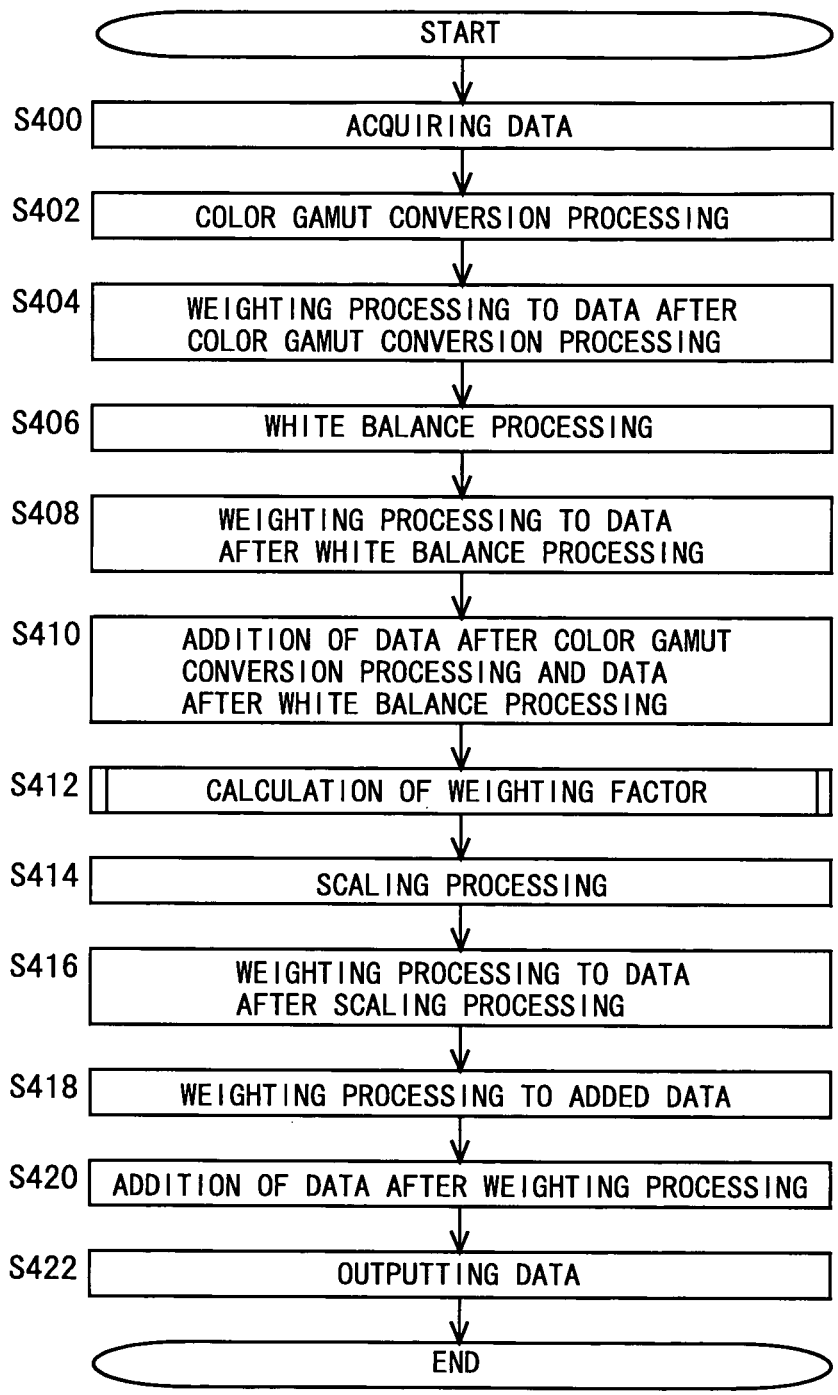
FIG. 12 is a flowchart showing a sequence of the image processing according to the fourth embodiment.

Next, a sequence of image processing according to this embodiment will be described. FIG. 12 is a flowchart showing a sequence of the image processing according to this embodiment. Note that, since the processings from the data acquisition (step S400) to the calculation of the weighting factor (step S412) are similar to those of the third embodiment, a description thereof is omitted.

In step S414, the scaling processor 170 performs scaling processing to the RGB data $RGB_{in}$ in the HDTV standard. The scaling processing in this step S414 is performed based on the equations (18) to (20). Next, the scaling data weighting processor 180 performs weighting processing to the data $RGB_S$ that has been generated in the process of step S414 (step S416). With this, data obtained by multiplying the value of the data $RGB_S$ obtained by the scaling processing by the first factor $k_1$ (=k) is outputted from the scaling data weighting processor 180.

Next, the added data weighting processor 160 performs weighting processing to the data that has been generated in the process of step S410 (step S418). With this, data obtained by multiplying the value of the data obtained through the adding processing by the data adder 130 by the second factor k$_2$ (=1−k) is outputted from the added data weighting processor 160. Next, the output adder 190 adds the data that has been generated in the process of step S416 and the data that has been generated in the process of step S418 (step S420). Then, the output adder 190 supplies the data RGB$_{out}$ after the addition to the liquid crystal panel 109 (step S422).

As described above, for the data of a single pixel included in the inputted data, the conversion processing from the RGB data RGB$_{in}$ in the HDTV standard into the RGB data RGB$_{OUT}$ to be supplied to the liquid crystal panel 109 is performed. It should be noted that this conversion processing is expressed by a following equation (21).

[Equation 7]

$$\begin{pmatrix} R \\ G \\ B \end{pmatrix}_{OUT} = (1-k) \times \left( \alpha \times \begin{pmatrix} R \\ G \\ B \end{pmatrix}_{panel} + (1-\alpha) \times \begin{pmatrix} R \\ G \\ B \end{pmatrix}_{WB} \right) + k \times \begin{pmatrix} R \\ G \\ B \end{pmatrix}_{S} \quad (21)$$

<5.3 Effects>

According to this embodiment, the scaling processing that multiplies the values of colors of the externally supplied RGB data RGB$_{in}$ respectively by the factors each determined for the corresponding color is performed. Then, the combined data of the data obtained through weighting processing to the data after the scaling processing and the data obtained through weighting processing to the data after the color gamut conversion processing and the white balance processing is supplied to the liquid crystal panel 109, thereby performing display based on the combined data. Therefore, it is possible to obtain the same effect as the third embodiment, as well as to adjust saturation of colors to be displayed in the liquid crystal panel 109 when performing display using, on the xy chromaticity diagram, colors of a further outward side (display using colors of a wider range).

<6. Modified Examples>

Modified examples of the embodiments described above will now be described.

<6.1 Modified Example for First Factor and Second Factor>

In the embodiments described above, the first factor k$_1$ and the second factor k$_2$ that are used for performing weighting processing to the inputted data and the data after various conversion processing are obtained based on the weighting factor k that is obtained by the equation (8), that is, the weighting factor k obtained by dividing l$_{BP}$ by l$_{BH}$. However, the present invention is not limited to this. For example, it is possible to employ a configuration in which a function of the weighting factor k obtained by the equation (8) is taken as the first factor k$_1$, and a value obtained by subtracting the first factor k$_1$ from 1 is taken as the second factor k$_2$.

In this case, as for the first factor k$_1$, it is possible to employ a configuration in which it is obtained by a linear equation, and it is possible to employ a configuration in which it is obtained by a nonlinear equation. For example, if the configuration is such that the first factor k$_1$ is obtained by a following equation (22), the same conversion processing as that in the embodiments described above is performed.

$$k_1 = k \quad (22)$$

Further, for example, it is possible to employ a configuration in which the first factor k$_1$ is obtained by a nonlinear equation as shown by a following equation (23). Here, e is a base of natural logarithm, and λ is a positive factor that can be determined to be any given value.

$$k_1 = 1 - e^{-k\lambda} \quad (23)$$

By employing the configuration in which k$_1$ is obtained by the nonlinear equation as described above, it is possible to perform image display taking full advantage of the color reproduction performance of the panel while reducing a feeling of strangeness provided for a viewer. It should be noted that, as the first factor k$_1$ should be determined based on such as human visual features, it is desirable to determine the first factor k$_1$ based on, not limited to the equation (22) and the equation (23), such as statistical data for visual quality of an image.

In the meantime, regarding the configuration in which k$_1$ as a function of k is used as the first factor, it is possible to store k$_1$ in a previously prepared look-up table and to acquire the first factor k$_1$ from the look-up table. This can be realized in a manner described below, for example. First, a number N of data pieces for the first factor k$_1$ to be stored in the look-up table is determined. Then, an equation, as shown by a following equation (24) for example, is defined as an equation for obtaining a value of the first factor k$_1$. It should be noted that i is an index when referring the look-up table, and is an integer that is not less than 0 and smaller than N.

$$k_1[i] = 1 - e^{-i\lambda} \quad (24)$$

Next, in the equation (24), after a value for λ is determined, an integer not less than 0 and smaller than N is sequentially substituted into the index i. With this, assuming that the number N of data pieces for the first factor k$_1$ is "32", for example, a look-up table as shown in FIG. 13, for example, including 32 data pieces as first factors k$_i$[0]−k$_1$[31] is generated. It is preferable to store the look-up table thus generated into the image processing device and to employ such a configuration that the weighting factor calculator 140 can refer the look-up table.

The index i used for referring the look-up table so that the weighting factor calculator 140 acquires the value of the first factor k$_1$ can be acquired, for example, by making a product of "k obtained by the equation (8)" and "the number N of data pieces for the first factor k$_1$" to be an integer (e.g., a value obtained by rounding down to the nearest whole number). For example, if the value of k obtained by the equation (8) is "0.1", and if the number N of data pieces for the first factor k$_1$ is "32", "3" that is obtained by rounding down "3.2" as a product of "0.1" and "32" to the nearest whole number is taken as the index i that is used by the weighting factor calculator 140 when referring the look-up table. However, when the value of k is "1", a product of "1" and "32" is "32" even though a maximum value of the index i is "31". Therefore, "31" is taken as the index i that is used by the weighting factor calculator 140 when referring the look-up table.

As described above, by providing the look-up table that stores values for the first factor k$_1$, it is possible to eliminate the necessity for the weighting factor calculator 140 to perform the arithmetic processing based on the nonlinear equation as expressed by the equation (23) during operation of the display apparatus 10, and thus facilitate the implementation.

<6.2 Modified Example for Boundary Line>

Figure 14:
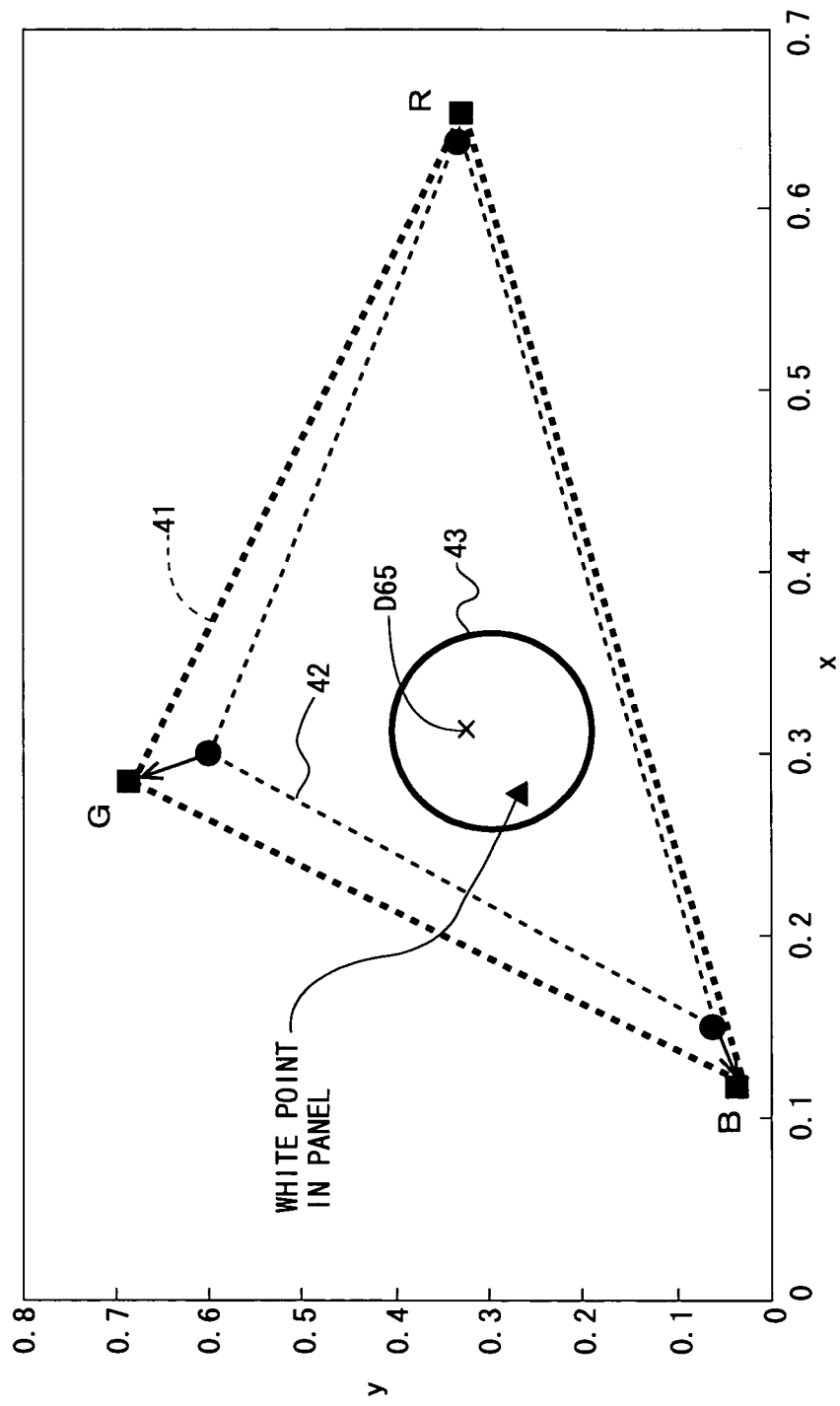
FIG. 14 is an xy chromaticity diagram illustrating an example in which a boundary line is circular in the modified example according to the embodiments.

In the embodiments described above, the shape of the boundary line 43 on the xy chromaticity diagram defines an enneagon shape (see FIG. 3). However, the present invention is not limited to this. The shape of the boundary line 43 can be a polygon other than an enneagon, or can be circular as shown in FIG. 14 for example, as long as it is possible to express the shape by an equation on an xy plane. It should be noted that, as the visual quality of an image on a screen depends on a viewer's preference, it is preferable to acquire a large amount of statistical data for visual quality of an image, and to determine the boundary line 43 based on the acquired statistical data.

Further, in the embodiments described above, the configuration is such that the chromaticity coordinates of memory colors and D65 (reference white color) are included within the boundary line 43. However, the present invention is not limited to this. For example, the configuration may be such that chromaticity coordinates of colors that should be displayed accurately to the inputted video signal other than memory colors and the chromaticity coordinate of D65 are included within the boundary line 43, or the configuration may be such that the chromaticity coordinate of a reference white color (such as D93) other than D65 is included within the boundary line 43.

<6.3 Modified Example for Chromaticity Diagram>

In the embodiments described above, the xy chromaticity diagram is used to calculate the weighting factor k. However, the present invention is not limited to this. It is possible to calculate the weighting factor k using a uv chromaticity diagram in place of the xy chromaticity diagram. In this case, values for u and v can be obtained based on following equations (25) and (26).

$$u=4X/(X+15Y+3Z) \quad (25)$$

$$v=6Y/(X+15Y+3Z) \quad (26)$$

It should be noted that a sequence of the calculation of the weighting factor k is the same as the sequence using the xy chromaticity diagram.

<6.4 Modified Example for Inputted Video Signal>

In the embodiments described above, the description is made using an example in which the RGB signal in the HDTV standard is supplied to the display apparatus 10 from an external. However, the present invention is not limited to this. For example, the present invention can be applied to a configuration in which an RGB signal in a standard other than the HDTV standard, such as the EBU (European Broadcasting Union) standard and the NTSC (National Television System Committee) standard, is supplied to the display apparatus 10 from the external.

DESCRIPTION OF REFERENCE NUMERALS

10: Display Apparatus
20: Signal Source
41: (Outline of) Color Reproduction Range of Liquid Crystal Panel
42: (Outline of) Color Reproduction Range Based on the HDTV Standard
43: Boundary Line
101, 102, 103, 104: Image Processing Device
109: Liquid Crystal Panel
110: Color Gamut Conversion Processor
112: First Post-Color-Gamut-Conversion Data Weighting Processor
114: Second Post-Color-Gamut-Conversion Data Weighting Processor
120: White Balance Processor
122: First Post-White-Balance Data Weighting Processor
124: Second Post-White-Balance Data Weighting Processor
130: Data Adder
140: Weighting Factor Calculator
150: Inputted Data Weighting Processor
160: Added Data Weighting Processor
170: Scaling Processor
180: Scaling Data Weighting Processor
190: Output Adder
k: Weighting Factor

The invention claimed is:

1. An image processing device, comprising:
an RGB data converter configured to perform predetermined conversion processing to first RGB data to generate second RGB data, the first RGB data being externally supplied image data in an RGB colorimetric system;
a weighting factor calculator configured to convert the first RGB data into XYZ data and to calculate a weighting factor based on the XYZ data, the XYZ data being data in an XYZ colorimetric system, the weighting factor being used for performing weighting processing to the first RGB data and the second RGB data;
a first weighting processor configured to perform weighting processing to the first RGB data by multiplying the first RGB data by a first factor obtained based on the weighting factor;
a second weighting processor configured to perform weighting processing to the second RGB data by multiplying the second RGB data by a second factor obtained based on the weighting factor, the second factor increasing and decreasing in an manner opposite to the first factor; and
an output adder configured to generate RGB data for output to be supplied to an external output device by adding data obtained through the weighting processing by first weighting processor and data obtained through the weighting processing by the second weighting processor, wherein
the weighting factor calculator:
obtains a first coordinate, a second coordinate, and a third coordinate for data of each pixel included in the XYZ data, on one of an xy chromaticity diagram and a uv chromaticity diagram, and calculates the weighting factor based on a positional relation among the first coordinate, the second coordinate, and the third coordinate, the first coordinate being a chromaticity coordinate of the corresponding pixel data, the second coordinate being a chromaticity coordinate of an intersection point between a weighting factor calculation line, that is a straight line passing a predetermined reference coordinate and the first coordinate, and a line indicating a color reproduction range obtained by the XYZ data, the third coordinate being a chromaticity coordinate of an intersection point between a boundary line that includes at least three points and defines a closed region and the weighting factor calculation line, and
determines a value of the weighting factor such that a value of the first factor is 0, when the first coordinate is within the boundary line.

2. The image processing device according to claim 1, wherein
when the first coordinate is outside the boundary line, the weighting factor calculator takes a value obtained by dividing a distance between the third coordinate and the first coordinate by a distance between the third coordinate and the second coordinate as the value of the weighting factor.

3. The image processing device according to claim 1, wherein
the value of the first factor is equal to the value of the weighting factor.

4. The image processing device according to claim 1, wherein
the value of the first factor is obtained by an equation, $$k_1 = 1 - e^{-k\lambda},$$

wherein, $k_1$ is the first factor, k is the weighting factor, e is a base of natural logarithm, and $\lambda$ is a positive factor that is determinable to be any value.

5. The image processing device according to claim 4, further comprising a look-up table that previously stores a plurality of values of the first factor each in association with a predetermined index, wherein
the weighting factor calculator acquires a value of the first factor from the look-up table by using an index obtained based on the weighting factor.

6. The image processing device according to claim 1, wherein
the RGB data converter includes a color gamut conversion processor configured to generate the second RGB data such that a color reproduction range to be a reference when the first RGB data is generated is equal to a color reproduction range obtained by supplying the second RGB data to the output device.

7. The image processing device according to claim 1, wherein
the RGB data converter includes a white balance processor configured to generate the second RGB data by multiplying a value of each color of the first RGB data by a gain that is previously determined for the corresponding color.

8. The image processing device according to claim 1, wherein
the RGB data converter includes:
a color gamut conversion processor configured to perform conversion processing to the first RGB data to generate the third RGB data such that a color reproduction range obtained by supplying the third RGB data to the output device is equal to a color reproduction range to be a reference when the first RGB data is generated, the third RGB data being data obtained after the conversion of the first RGB data;
a third weighting processor configured to perform weighting processing to the third RGB data by multiplying the third RGB data by a previously determined third factor;
a white balance processor configured to generate fourth RGB data by multiplying a value of each color of the first RGB data by a gain that is previously determined for the corresponding color;
a fourth weighting processor configured to perform weighting processing to the fourth RGB data by multiplying the fourth RGB data by a fourth factor increasing and decreasing in an manner opposite to the third factor; and
a data adder configured to generate the second RGB data by adding data obtained through the weighting processing by the third weighting processor and data obtained through the weighting processing by the fourth weighting processor.

9. The image processing device according to claim 8, further comprising a scaling processor and a fifth weighting processor, in place of the first weighting processor, the scaling processor generating fifth RGB data by multiplying the value of each color of the first RGB data by a scaling factor that is previously determined for the corresponding color, the fifth weighting processor performing weighting processing to the fifth RGB data by multiplying the fifth RGB data by the first factor, wherein
the output adder adds data obtained through the weighting processing by the fifth weighting processor in place of the first weighting processor and data obtained through the weighting processing by the second weighting processor.

10. The image processing device according to claim 1, wherein
the boundary line is defined so as to include therein a chromaticity coordinate for D65 which is a standard light source.

11. The image processing device according to claim 1, wherein
the boundary line is defined so as to include therein chromaticity coordinates of memory color including at least white color and flesh color.

12. A display apparatus having a display panel, as the output device, configured to display an image, the display apparatus comprising:
the image processing device according to claim 1.

13. An image processing method, comprising:
an RGB data converting step of performing predetermined conversion processing to first RGB data to generate second RGB data, the first RGB data being externally supplied image data in an RGB colorimetric system;
a weighting factor calculating step of converting the first RGB data into XYZ data and calculating a weighting factor based on the XYZ data, the XYZ data being data in an XYZ colorimetric system, the weighting factor being used for performing weighting processing to the first RGB data and the second RGB data;
a first weighting processing step of performing weighting processing to the first RGB data by multiplying the first RGB data by a first factor obtained based on the weighting factor;
a second weighting processing step of performing weighting processing to the second RGB data by multiplying the second RGB data by a second factor obtained based on the weighting factor, the second factor increasing and decreasing in an manner opposite to the first factor; and
an output adding step of generating RGB data for output to be supplied to an output device by adding data obtained through the weighting processing in the first weighting processing step and data obtained through the weighting processing in the second weighting processing step,
wherein
in the weighting factor calculating step,
a first coordinate, a second coordinate, and a third coordinate are obtained for data of each pixel included in the XYZ data, on one of an xy chromaticity diagram and a uv chromaticity diagram, and the weighting factor is calculated based on a positional relation among the first coordinate, the second coordinate, and the third coordinate, the first coordinate being a chromaticity coordinate of the corresponding pixel data, the second coordinate being a chromaticity coordinate of an intersection point between a weighting factor calculation line, that is a straight line passing a predetermined reference coordinate and the first coordinate, and a line indicating a color reproduction range obtained by the XYZ data, the third coordinate being a chromaticity coordinate of an intersection point between a boundary line that includes at least three points and defines a closed region and the weighting factor calculation line, and a value of the weighting factor is determined such that a value of the first factor is 0, when the first coordinate is within the boundary line.

14. The image processing method according to claim 13, wherein in the weighting factor calculating step, a value obtained by dividing a distance between the third coordinate and the first coordinate by a distance between the third coordinate and the second coordinate is taken as the value of the weighting factor, when the first coordinate is outside the boundary line.

15. The image processing method according to claim 13, wherein the value of the first factor is equal to the value of the weighting factor.

16. The image processing method according to claim 13, wherein the value of the first factor is obtained by an equation, $$k_1 = 1 - e^{-k\lambda}$$

wherein, $k_1$ is the first factor, k is the weighting factor, e is a base of natural logarithm, and $\lambda$ is a positive factor that is determinable to be any value.

17. The image processing method according to claim 16, wherein in the weighting factor calculating step, a value of the first factor is acquired from a look-up table by using an index obtained based on the weighting factor, the look-up table previously storing a plurality of values of the first factor each in association with a predetermined index.

18. The image processing method according to claim 13, wherein the RGB data converting step includes a color gamut conversion processing step of generating the second RGB data such that a color reproduction range to be a reference when the first RGB data is generated is equal to a color reproduction range obtained by supplying the second RGB data to the output device.

19. The image processing method according to claim 13, wherein the RGB data converting step includes a white balance processing step of generating the second RGB data by multiplying a value of each color of the first RGB data by a gain that is previously determined for the corresponding color.

20. The image processing method according to claim 13, wherein the RGB data converting step includes:

a color gamut conversion processing step of performing conversion processing to the first RGB data to generate the third RGB data such that a color reproduction range obtained by supplying the third RGB data to the output device is equal to a color reproduction range to be a reference when the first RGB data is generated, the third RGB data being data obtained after the conversion of the first RGB data;

a third weighting processing step of performing weighting processing to the third RGB data by multiplying the third RGB data by a previously determined third factor;

a white balance processing step of generating fourth RGB data by multiplying a value of each color of the first RGB data by a gain that is previously determined for the corresponding color;

a fourth weighting processing step of performing weighting processing to the fourth RGB data by multiplying the fourth RGB data by a fourth factor increasing and decreasing in an manner opposite to the third factor; and a data adding step of generating the second RGB data by adding data obtained through the weighting processing in the third weighting processing step and data obtained through the weighting processing in the fourth weighting processing step.

21. The image processing method according to claim 20, further comprising a scaling processing step and a fifth weighting processing step, in place of the first weighting processing step, the scaling processing step being a step of generating fifth RGB data by multiplying the value of each color of the first RGB data by a scaling factor that is previously determined for the corresponding color, the fifth weighting processing step being a step of performing weighting processing to the fifth RGB data by multiplying the fifth RGB data by the first factor, wherein in the output adding step, data obtained through the weighting processing in the fifth weighting processing step in place of the first weighting processing step and data obtained through the weighting processing in the second weighting processing step are added.

22. The image processing method according to claim 13, wherein the boundary line is defined so as to include therein a chromaticity coordinate for D65 which is a standard light source.

23. The image processing method according to claim 13, wherein the boundary line is defined so as to include therein chromaticity coordinates of memory color including at least white color and flesh color.

24. A display apparatus having a display panel, as the output device, configured to display an image, the display apparatus comprising:

the image processing device according to claim 2.

25. A display apparatus having a display panel, as the output device, configured to display an image, the display apparatus comprising:

the image processing device according to claim 3.

26. A display apparatus having a display panel, as the output device, configured to display an image, the display apparatus comprising:

the image processing device according to claim 4.

27. A display apparatus having a display panel, as the output device, configured to display an image, the display apparatus comprising:

the image processing device according to claim 5.

28. A display apparatus having a display panel, as the output device, configured to display an image, the display apparatus comprising:

the image processing device according to claim 6.

29. A display apparatus having a display panel, as the output device, configured to display an image, the display apparatus comprising:

the image processing device according to claim 7.

30. A display apparatus having a display panel, as the output device, configured to display an image, the display apparatus comprising:

the image processing device according to claim 8.

31. A display apparatus having a display panel, as the output device, configured to display an image, the display apparatus comprising:

the image processing device according to claim 9.

32. A display apparatus having a display panel, as the output device, configured to display an image, the display apparatus comprising:

the image processing device according to claim 10.

33. A display apparatus having a display panel, as the output device, configured to display an image, the display apparatus comprising:

the image processing device according to claim 11.

* * * * *